(12) United States Patent
Stapleton et al.

(10) Patent No.: US 11,563,492 B2
(45) Date of Patent: Jan. 24, 2023

(54) VIRTUAL RADIO ACCESS NETWORK USING SOFTWARE-DEFINED NETWORK OF REMOTES AND DIGITAL MULTIPLEXING SWITCHES

(71) Applicant: DALI SYSTEMS CO. LTD., Grand Cayman (KY)

(72) Inventors: Shawn Patrick Stapleton, Vancouver (CA); Sasa Trajkovic, Burnaby (CA)

(73) Assignee: DALI WIRELESS, INC., Menlo Park, CA (US)

( * ) Notice: Subject to any disclaimer, the term of this patent is extended or adjusted under 35 U.S.C. 154(b) by 0 days.

(21) Appl. No.: 16/734,833

(22) Filed: Jan. 6, 2020

(65) Prior Publication Data
US 2020/0186250 A1    Jun. 11, 2020

Related U.S. Application Data

(63) Continuation of application No. 15/358,060, filed on Nov. 21, 2016, now abandoned, which is a
(Continued)

(51) Int. Cl.
*H04B 10/2575* (2013.01)
*H04L 25/02* (2006.01)
*H04B 7/022* (2017.01)

(52) U.S. Cl.
CPC ....... *H04B 10/25753* (2013.01); *H04B 7/022* (2013.01); *H04L 25/02* (2013.01)

(58) Field of Classification Search
CPC .... H04B 10/25753; H04B 7/022; H04L 25/02
See application file for complete search history.

(56) References Cited

U.S. PATENT DOCUMENTS

| | | | |
|---|---|---|---|
| 3,854,122 A | 12/1974 | Cross | |
| 4,268,829 A * | 5/1981 | Baurle | ..................... G01S 3/04 342/368 |

(Continued)

FOREIGN PATENT DOCUMENTS

| | | |
|---|---|---|
| CA | 2306064 A | 10/2000 |
| CN | 101098328 A | 1/2008 |

(Continued)

OTHER PUBLICATIONS

Office Action (Including Translation) for Brazilian Application No. 1120140108951, dated Apr. 9, 2020.
(Continued)

*Primary Examiner* — Berhanu Tadese
(74) *Attorney, Agent, or Firm* — Artegis Law Group, LLP

(57) ABSTRACT

A system for routing signals in a Distributed Antenna System (DAS) includes one or more Base Band Units (BBUs). Each of the one or more BBUs has one or more digital outputs. The system also includes a plurality of Digital Multiplexer Units (DMUs) coupled to each other and operable to route signals between the plurality of DMUs. Each of the plurality of DMUs is operable to receive one or more digital inputs from the one or more BBUs. The system further includes a plurality of Digital Remote Units (DRUs) coupled to the plurality of DMUs and operable to transport signals between the plurality of DRUs and one or more of the plurality of DMUs.

21 Claims, 18 Drawing Sheets

Related U.S. Application Data continuation-in-part of application No. 14/580,585, filed on Dec. 23, 2014, now Pat. No. 10,637,537.

(60) Provisional application No. 62/258,289, filed on Nov. 20, 2015, provisional application No. 61/920,397, filed on Dec. 23, 2013.

(56) References Cited

U.S. PATENT DOCUMENTS

| | | | | |
|---|---|---|---|---|
| 4,280,128 | A * | 7/1981 | Masak | G01S 3/06 |
| | | | | 342/368 |
| 4,887,235 | A * | 12/1989 | Holloway | G06K 13/0825 |
| | | | | 714/E11.002 |
| 5,805,983 | A | 9/1998 | Naidu et al. | |
| 5,848,060 | A * | 12/1998 | Dent | H04B 7/0851 |
| | | | | 455/12.1 |
| 5,867,763 | A | 2/1999 | Dean et al. | |
| 6,167,286 | A | 12/2000 | Ward et al. | |
| 6,308,085 | B1 | 10/2001 | Shoki | |
| 6,381,227 | B1 * | 4/2002 | Fielding | H04B 7/18582 |
| | | | | 370/321 |
| 6,628,958 | B1 | 9/2003 | Kamel et al. | |
| 6,704,545 | B1 | 3/2004 | Wala | |
| 6,785,558 | B1 | 8/2004 | Stratford et al. | |
| 6,801,767 | B1 | 10/2004 | Schwartz et al. | |
| 6,889,047 | B2 * | 5/2005 | Ishida | H04W 16/28 |
| | | | | 455/562.1 |
| 7,085,572 | B2 * | 8/2006 | Ishida | H04W 88/08 |
| | | | | 375/267 |
| 7,110,793 | B1 * | 9/2006 | Ishida | H04W 52/143 |
| | | | | 455/67.11 |
| 7,155,162 | B2 * | 12/2006 | Doi | H04B 7/0848 |
| | | | | 455/39 |
| 7,286,507 | B1 | 10/2007 | Oh et al. | |
| 7,319,683 | B2 * | 1/2008 | Doi | H04W 56/0085 |
| | | | | 370/348 |
| 7,339,897 | B2 | 3/2008 | Larsson et al. | |
| 7,356,355 | B2 * | 4/2008 | Ishida | H04B 7/0615 |
| | | | | 455/67.11 |
| 7,493,129 | B1 | 2/2009 | Mostafa et al. | |
| 7,542,725 | B2 * | 6/2009 | Ishida | H04B 7/0877 |
| | | | | 455/140 |
| 7,561,856 | B2 * | 7/2009 | Watabe | H03F 1/3247 |
| | | | | 455/127.1 |
| 7,590,354 | B2 | 9/2009 | Sauer et al. | |
| 7,639,982 | B2 | 12/2009 | Wala | |
| 7,738,381 | B2 | 6/2010 | Wiggins et al. | |
| 7,937,110 | B2 | 5/2011 | Wu et al. | |
| 8,195,224 | B2 * | 6/2012 | Saban | H04W 28/0226 |
| | | | | 455/562.1 |
| 8,204,144 | B2 * | 6/2012 | Takada | H04B 7/0413 |
| | | | | 375/267 |
| 8,213,401 | B2 * | 7/2012 | Fischer | H04W 88/085 |
| | | | | 370/345 |
| 8,264,986 | B2 * | 9/2012 | Nagano | H04W 36/0085 |
| | | | | 370/255 |
| 8,310,963 | B2 | 11/2012 | Singh | |
| 8,346,091 | B2 | 1/2013 | Kummetz et al. | |
| 8,346,160 | B2 | 1/2013 | Kummetz et al. | |
| 8,498,207 | B2 | 7/2013 | Trigui et al. | |
| 8,532,242 | B2 | 9/2013 | Fischer et al. | |
| 8,548,330 | B2 | 10/2013 | Berlin et al. | |
| 8,583,100 | B2 | 11/2013 | Koziy et al. | |
| 8,681,917 | B2 * | 3/2014 | McAllister | H04J 3/0658 |
| | | | | 375/376 |
| 8,693,342 | B2 | 4/2014 | Uyehara et al. | |
| 8,743,718 | B2 | 6/2014 | Grenier et al. | |
| 8,743,756 | B2 | 6/2014 | Uyehara et al. | |
| 8,743,759 | B2 | 6/2014 | Viswanathan et al. | |
| 8,744,504 | B2 | 6/2014 | Faccin et al. | |
| 8,761,141 | B2 * | 6/2014 | Leroudier | H04W 28/0247 |
| | | | | 370/395.5 |
| 8,811,169 | B2 * | 8/2014 | Suzuki | H04L 27/34 |
| | | | | 370/236 |
| 8,811,558 | B2 * | 8/2014 | Rolland | H04L 7/04 |
| | | | | 375/362 |
| 8,837,659 | B2 | 9/2014 | Uyehara et al. | |
| 8,837,940 | B2 | 9/2014 | Smith et al. | |
| 8,897,648 | B2 * | 11/2014 | Cvijetic | H04B 10/25754 |
| | | | | 398/115 |
| 8,929,288 | B2 * | 1/2015 | Stewart | H04W 88/085 |
| | | | | 455/560 |
| 8,929,950 | B2 | 1/2015 | Kobayashi et al. | |
| 8,958,410 | B2 * | 2/2015 | Fischer | H04W 88/085 |
| | | | | 370/345 |
| 8,958,789 | B2 | 2/2015 | Bauman et al. | |
| 9,001,641 | B2 * | 4/2015 | Bertrand | H04L 25/0226 |
| | | | | 370/314 |
| 9,020,070 | B2 * | 4/2015 | Bellot | H04W 88/085 |
| | | | | 375/299 |
| 9,077,517 | B2 * | 7/2015 | McAllister | H04L 7/0087 |
| 9,094,960 | B2 * | 7/2015 | He | H04L 1/1861 |
| 9,112,549 | B2 | 8/2015 | Stapleton | |
| 9,176,321 | B2 | 11/2015 | Olivieri | |
| 9,178,636 | B2 | 11/2015 | Fischer et al. | |
| 9,179,321 | B2 | 11/2015 | Hasarchi et al. | |
| 9,219,520 | B2 | 12/2015 | Uyehara et al. | |
| 9,246,559 | B2 | 1/2016 | Tarlazzi et al. | |
| 9,276,605 | B2 * | 3/2016 | Xia | H03M 7/6041 |
| 9,320,040 | B2 * | 4/2016 | Bellot | H04W 72/0453 |
| 9,367,828 | B2 * | 6/2016 | Zavadsky | G06Q 10/087 |
| 9,385,797 | B2 * | 7/2016 | Zavadsky | H04B 7/0802 |
| 9,398,464 | B2 | 7/2016 | Kummetz et al. | |
| 9,420,628 | B2 | 8/2016 | Spedaliere et al. | |
| 9,439,242 | B2 | 9/2016 | Stapleton et al. | |
| 9,509,487 | B2 * | 11/2016 | McAllister | H04L 1/0631 |
| 9,519,043 | B2 * | 12/2016 | Fix | G01S 5/0263 |
| 9,549,436 | B2 * | 1/2017 | Sundin | H04L 5/0032 |
| 9,622,148 | B2 * | 4/2017 | Stapleton | H04W 40/20 |
| 9,660,728 | B2 * | 5/2017 | Kerek | H04W 16/26 |
| 9,680,634 | B2 * | 6/2017 | McAllister | H04L 7/0087 |
| 9,787,457 | B2 | 10/2017 | Zavadsky et al. | |
| 9,788,335 | B2 * | 10/2017 | Miyata | H04B 7/0697 |
| 9,935,713 | B2 * | 4/2018 | Kerek | H04B 1/0057 |
| 10,009,790 | B2 * | 6/2018 | Leroudier | H04W 48/12 |
| 10,020,850 | B2 * | 7/2018 | Wala | H03J 7/04 |
| 10,027,469 | B2 * | 7/2018 | McAllister | H04L 7/033 |
| 10,045,314 | B2 | 8/2018 | Stapleton et al. | |
| RE47,466 | E * | 6/2019 | Fischer | H04L 65/611 |
| 10,461,919 | B2 * | 10/2019 | McAllister | H04J 3/0658 |
| 10,637,537 | B2 * | 4/2020 | Stapleton | H04B 7/022 |
| 10,674,423 | B2 * | 6/2020 | Lewis | H04B 17/318 |
| 10,855,338 | B2 * | 12/2020 | Wala | H04W 88/08 |
| 2001/0019952 | A1 * | 9/2001 | Ishida | H04W 16/28 |
| | | | | 455/414.1 |
| 2001/0037395 | A1 | 11/2001 | Sabat, Jr. et al. | |
| 2002/0093926 | A1 | 7/2002 | Kilfoyle | |
| 2002/0187809 | A1 | 12/2002 | Mani et al. | |
| 2003/0087618 | A1 * | 5/2003 | Li | H04H 20/48 |
| | | | | 455/260 |
| 2003/0103477 | A1 * | 6/2003 | Doi | H04W 56/0085 |
| | | | | 370/332 |
| 2003/0139152 | A1 * | 7/2003 | Doi | H04B 7/0848 |
| | | | | 455/101 |
| 2004/0004943 | A1 | 1/2004 | Kim et al. | |
| 2004/0136410 | A1 * | 7/2004 | Rio Herrero | H04B 7/18584 |
| | | | | 370/535 |
| 2004/0203339 | A1 | 10/2004 | Bauman | |
| 2005/0018630 | A1 | 1/2005 | Bianchi et al. | |
| 2005/0135286 | A1 | 6/2005 | Nurminen et al. | |
| 2005/0164656 | A1 * | 7/2005 | Watabe | H03F 1/3247 |
| | | | | 330/149 |
| 2005/0181812 | A1 | 8/2005 | Scheck | |
| 2006/0240870 | A1 * | 10/2006 | Ishida | H04W 16/28 |
| | | | | 455/562.1 |
| 2007/0036174 | A1 * | 2/2007 | Aris | H04L 12/2856 |
| | | | | 370/535 |
| 2007/0066234 | A1 | 3/2007 | Lastinger et al. | |
| 2007/0104165 | A1 * | 5/2007 | Hanaoka | H04B 7/0417 |
| | | | | 370/338 |

(56) References Cited

U.S. PATENT DOCUMENTS

| | | |
|---|---|---|
| 2007/0177552 A1 | 8/2007 | Wu et al. |
| 2007/0178991 A1 | 8/2007 | Williams |
| 2008/0063397 A1 | 3/2008 | Hu et al. |
| 2008/0074289 A1 | 3/2008 | Sauder et al. |
| 2008/0076424 A1 | 3/2008 | Barber et al. |
| 2008/0107014 A1 | 5/2008 | Huang et al. |
| 2008/0134194 A1 | 6/2008 | Liu |
| 2008/0139205 A1 | 6/2008 | Sayeedi |
| 2008/0214221 A1 | 9/2008 | Kiyomoto et al. |
| 2008/0232305 A1 | 9/2008 | Oren et al. |
| 2008/0310526 A1 | 12/2008 | Maltsev et al. |
| 2008/0310528 A1 | 12/2008 | Soong et al. |
| 2009/0252139 A1 | 1/2009 | Ludovico et al. |
| 2009/0059861 A1 | 3/2009 | Gunnarsson et al. |
| 2009/0116814 A1* | 5/2009 | Morohashi ............ H04N 5/92 455/556.1 |
| 2009/0143065 A1 | 6/2009 | Mattila |
| 2009/0149221 A1* | 6/2009 | Liu .................... H04W 88/085 455/561 |
| 2009/0180407 A1 | 7/2009 | Sabat et al. |
| 2009/0180426 A1* | 7/2009 | Sabat ................. H04W 88/085 398/116 |
| 2009/0196215 A1 | 8/2009 | Sabat et al. |
| 2009/0232191 A1 | 9/2009 | Gupta et al. |
| 2009/0252136 A1 | 10/2009 | Mahany et al. |
| 2009/0268675 A1 | 10/2009 | Choi |
| 2010/0002661 A1 | 1/2010 | Schmidt et al. |
| 2010/0027595 A1* | 2/2010 | Takada ............... H04B 7/0413 375/267 |
| 2010/0067906 A1* | 3/2010 | Adhikari ............... H01Q 1/246 398/48 |
| 2010/0093391 A1* | 4/2010 | Saban ................ H04W 88/085 455/562.1 |
| 2010/0128676 A1 | 5/2010 | Wu et al. |
| 2010/0157901 A1 | 6/2010 | Sanderovitz et al. |
| 2010/0177759 A1 | 7/2010 | Fischer et al. |
| 2010/0178936 A1 | 7/2010 | Wala et al. |
| 2010/0208777 A1 | 8/2010 | Ogaz |
| 2010/0210232 A1 | 8/2010 | Dominguez Romero et al. |
| 2010/0266287 A1* | 10/2010 | Adhikari ............. H04W 88/085 455/562.1 |
| 2010/0278530 A1 | 11/2010 | Kummetz et al. |
| 2010/0296816 A1 | 11/2010 | Larson |
| 2010/0322107 A1* | 12/2010 | Nagano ............. H04W 36/0085 370/254 |
| 2011/0105184 A1 | 5/2011 | Piirainen et al. |
| 2011/0122860 A1 | 5/2011 | Guan et al. |
| 2011/0135308 A1 | 6/2011 | Tarlazzi et al. |
| 2011/0149879 A1 | 6/2011 | Noriega et al. |
| 2011/0158081 A1 | 6/2011 | Wang et al. |
| 2011/0143649 A1 | 7/2011 | Sabat, Jr. et al. |
| 2011/0171944 A1 | 7/2011 | Kobayashi et al. |
| 2011/0201368 A1 | 8/2011 | Faccin et al. |
| 2011/0222467 A1* | 9/2011 | Fujimura ................ H04J 1/05 370/316 |
| 2011/0268446 A1 | 11/2011 | Cune et al. |
| 2011/0268452 A1* | 11/2011 | Beamon ............... G02B 6/0365 398/116 |
| 2011/0269449 A1 | 11/2011 | Kazmi et al. |
| 2011/0287791 A1 | 11/2011 | Fujishima et al. |
| 2012/0027145 A1 | 2/2012 | Uyehara et al. |
| 2012/0039254 A1 | 2/2012 | Stapleton et al. |
| 2012/0057572 A1 | 3/2012 | Evans et al. |
| 2012/0069880 A1 | 3/2012 | Lemson et al. |
| 2012/0127938 A1 | 3/2012 | Lv et al. |
| 2012/0099490 A1 | 4/2012 | Kummetz et al. |
| 2012/0106657 A1* | 5/2012 | Fischer ................ H04B 7/2606 375/259 |
| 2012/0121047 A1* | 5/2012 | Jia ................... H04L 25/03318 375/343 |
| 2012/0121240 A1 | 5/2012 | Ueda |
| 2012/0121249 A1 | 5/2012 | Sabat et al. |
| 2012/0177026 A1* | 7/2012 | Uyehara ............. H04B 7/0413 370/345 |
| 2012/0182857 A1* | 7/2012 | Bertrand ............ H04L 25/0228 370/210 |
| 2012/0188985 A1 | 7/2012 | Miyamoto et al. |
| 2012/0206885 A1 | 8/2012 | Pan et al. |
| 2012/0208584 A1 | 8/2012 | Liao |
| 2012/0230190 A1* | 9/2012 | Suzuki ................ H04L 1/0003 370/236 |
| 2012/0236953 A1 | 9/2012 | Mueck |
| 2012/0257575 A1 | 10/2012 | Davydov et al. |
| 2012/0257659 A1 | 10/2012 | Braz et al. |
| 2012/0281622 A1* | 11/2012 | Saban ............... H04W 28/0226 370/328 |
| 2012/0314665 A1* | 12/2012 | Ishida .................... H01Q 21/28 370/329 |
| 2012/0314797 A1 | 12/2012 | Kummetz et al. |
| 2012/0314824 A1* | 12/2012 | Fujimura ............ H04B 1/1036 375/350 |
| 2013/0017863 A1 | 1/2013 | Kummetz et al. |
| 2013/0023285 A1 | 1/2013 | Markhovsky et al. |
| 2013/0028218 A1 | 1/2013 | Chun et al. |
| 2013/0089336 A1 | 4/2013 | Dahlfort et al. |
| 2013/0095873 A1 | 4/2013 | Soriaga et al. |
| 2013/0100907 A1* | 4/2013 | Liu ...................... H04L 5/0048 370/329 |
| 2013/0107763 A1* | 5/2013 | Uyehara ............. H04B 7/2656 370/278 |
| 2013/0114486 A1 | 5/2013 | Spedaliere et al. |
| 2013/0114863 A1 | 5/2013 | Kamata et al. |
| 2013/0114963 A1* | 5/2013 | Stapleton ............. H04W 24/02 398/115 |
| 2013/0121249 A1 | 5/2013 | Ji et al. |
| 2013/0122830 A1 | 5/2013 | Wang et al. |
| 2013/0128832 A1 | 5/2013 | Kang et al. |
| 2013/0170353 A1* | 7/2013 | Liu .................... H04W 72/0486 370/235 |
| 2013/0188753 A1 | 7/2013 | Tarlazzi et al. |
| 2013/0229977 A1* | 9/2013 | Rudrapatna ........ H04B 7/18513 370/319 |
| 2013/0272441 A1 | 10/2013 | Uyehara et al. |
| 2013/0279452 A1* | 10/2013 | Liu ................... H04W 72/1268 370/329 |
| 2013/0294253 A1* | 11/2013 | Leroudier ............ H04L 5/0001 370/329 |
| 2013/0294541 A1* | 11/2013 | Blanc ................. H04W 24/00 375/295 |
| 2013/0322358 A1* | 12/2013 | He ....................... H04L 1/1861 370/329 |
| 2014/0029431 A1 | 1/2014 | Haberland et al. |
| 2014/0050483 A1 | 2/2014 | Berlin et al. |
| 2014/0146797 A1* | 5/2014 | Zavadsky ............... H04J 3/16 370/336 |
| 2014/0146905 A1* | 5/2014 | Zavadsky ............ H04B 7/0802 375/267 |
| 2014/0146906 A1* | 5/2014 | Zavadsky ............ G06Q 10/087 375/267 |
| 2014/0162713 A1* | 6/2014 | Stapleton ........... H04W 56/0005 455/509 |
| 2014/0169263 A1 | 6/2014 | Stapleton |
| 2014/0219140 A1 | 8/2014 | Uyehara et al. |
| 2014/0226736 A1 | 8/2014 | Niu et al. |
| 2014/0233548 A1 | 8/2014 | Leizerovich et al. |
| 2014/0241258 A1 | 8/2014 | Zack et al. |
| 2014/0241315 A1 | 8/2014 | Niu et al. |
| 2014/0243033 A1* | 8/2014 | Wala .................... H04W 24/00 455/517 |
| 2014/0269966 A1 | 9/2014 | Faccin et al. |
| 2014/0328274 A1* | 11/2014 | Blanc ................. H04W 72/0453 370/329 |
| 2014/0328308 A1* | 11/2014 | Sundin .................. H04L 5/003 370/329 |
| 2014/0334305 A1* | 11/2014 | Leroudier ............ H04W 24/00 370/235 |
| 2014/0348068 A1* | 11/2014 | Morper ................ H04W 88/16 370/328 |
| 2015/0016311 A1* | 1/2015 | Han .................... H04W 72/0413 370/280 |

(56) References Cited

U.S. PATENT DOCUMENTS

| | | | |
|---|---|---|---|
| 2015/0131494 A1* | 5/2015 | He | H04B 7/046 370/280 |
| 2015/0131750 A1* | 5/2015 | Xue | H04B 7/0482 375/267 |
| 2015/0139087 A1* | 5/2015 | Luft | H04L 9/14 370/329 |
| 2015/0243250 A1* | 8/2015 | Fukuda | G09G 5/02 345/589 |
| 2015/0244461 A1* | 8/2015 | Kerek | H04B 10/2589 398/43 |
| 2015/0256358 A1 | 9/2015 | Stapleton et al. | |
| 2015/0303950 A1* | 10/2015 | Shattil | H04B 1/0003 370/328 |
| 2015/0303998 A1* | 10/2015 | Stapleton | H04B 7/022 375/267 |
| 2015/0358030 A1* | 12/2015 | Xia | H03M 7/6041 341/87 |
| 2016/0007264 A1 | 1/2016 | Stapleton et al. | |
| 2016/0014782 A1* | 1/2016 | Stapleton | H04W 72/04 370/329 |
| 2016/0056883 A1* | 2/2016 | Fujimura | H04B 1/005 370/325 |
| 2016/0373232 A1* | 12/2016 | Zavadsky | H04L 5/0085 |
| 2017/0111115 A1* | 4/2017 | Kerek | H04B 10/25891 |
| 2017/0250927 A1* | 8/2017 | Stapleton | H04B 10/25753 |
| 2017/0311330 A1* | 10/2017 | Gandhi | H04B 1/3838 |
| 2017/0339625 A1* | 11/2017 | Stapleton | H04B 10/25753 |
| 2018/0041992 A1* | 2/2018 | Bin Sediq | H04L 5/0044 |
| 2018/0234875 A1* | 8/2018 | Leroudier | H04W 24/00 |
| 2018/0323831 A1* | 11/2018 | Wala | H01Q 1/246 |
| 2019/0054908 A1 | 2/2019 | Adachi et al. | |
| 2019/0082407 A1 | 3/2019 | Stapleton et al. | |
| 2019/0215729 A1* | 7/2019 | Oyman | H04L 65/1016 |
| 2019/0289526 A1* | 9/2019 | Stapleton | H04B 7/026 |
| 2020/0008128 A1* | 1/2020 | Lewis | H04L 41/0668 |
| 2020/0067815 A1* | 2/2020 | Lewis | H04W 88/085 |
| 2020/0068474 A1* | 2/2020 | Lewis | H04B 17/318 |
| 2020/0186250 A1* | 6/2020 | Stapleton | H04B 7/022 |
| 2020/0244316 A1* | 7/2020 | Stapleton | H04L 45/00 |
| 2021/0100066 A1* | 4/2021 | Braun | H04W 16/24 |

FOREIGN PATENT DOCUMENTS

| | | | |
|---|---|---|---|
| CN | 100544458 C | 9/2009 | |
| CN | 101621806 A | 1/2010 | |
| CN | 103299557 A | 9/2013 | |
| CN | 103338167 A | 10/2013 | |
| EP | 1047210 A2 | 10/2000 | |
| EP | 1883167 A1 | 1/2008 | |
| EP | 2173136 A1 * | 4/2010 | H04J 3/0682 |
| EP | 2512202 A1 | 10/2012 | |
| EP | 2846475 A2 | 3/2015 | |
| JP | 2007-529926 A | 10/2007 | |
| JP | 2008-035521 A | 2/2008 | |
| JP | 2010-128876 A | 10/2010 | |
| JP | 2012-015572 A | 1/2012 | |
| JP | 2017087937 A * | 5/2017 | B60T 8/328 |
| KR | 10-2011-0117889 A | 10/2011 | |
| KR | 20130114963 A * | 10/2013 | F25D 23/00 |
| KR | 10-1348424 B1 | 1/2014 | |
| WO | WO-9501012 A1 * | 1/1995 | H04B 7/1858 |
| WO | WO 2006/134642 | 12/2006 | |
| WO | WO 2008/076432 | 6/2008 | |
| WO | WO-2009003335 A1 * | 1/2009 | H04J 3/0682 |
| WO | WO 2009/130199 | 10/2009 | |
| WO | WO 2011/039867 | 4/2011 | |
| WO | WO-2012058182 A1 * | 5/2012 | H04B 7/022 |
| WO | WO 2012/139781 | 10/2012 | |
| WO | WO 2013/009835 | 1/2013 | |
| WO | WO 2013/040589 | 3/2013 | |
| WO | WO 2013/048526 | 4/2013 | |
| WO | WO 2013/070614 | 5/2013 | |
| WO | WO-2013063025 A1 * | 5/2013 | H04B 1/44 |
| WO | WO-2013164445 A1 * | 11/2013 | H04L 25/02 |
| WO | WO 2015/100315 | 7/2015 | |
| WO | WO-2015100315 A1 * | 7/2015 | H04B 10/25753 |
| WO | WO-2016103509 A1 * | 6/2016 | H01M 10/052 |
| WO | WO-2017081582 A1 * | 5/2017 | B60T 8/328 |
| WO | WO-2017087937 A1 * | 5/2017 | H04B 7/024 |

OTHER PUBLICATIONS

U.S. Appl. No. 61/374,593, filed Aug. 17, 2010, Lemson et al.
Florida Center for Instructional Technology College of Education, University of South Florida "An Educator's Guide to School Networks" Chapter 5: Topology; 1997.
Liao, Ching-Yu, et al. "Comparison of Downlink Power Allocation Mechanisms in Soft Handoff for the WCDMA System with Heterogeneous Cell Structures" Wireless Networks vol. 11, 593-605; Sep. 2005.
Pato, Silvia et al. "On Building a Distributed Antenna System with Joint Signal Processing for Next-Generation Wireless Access Networks: The FUTON Approach" Published 2009.
International Search Report for International Application No. PCT/US2012/063721, dated Jan. 18, 2013.
Written Opinion for International Application No. PCT/US2012/063721, dated Jan. 18, 2013.
International Preliminary Report on Patentability for International Application No. PCT/US2012/063721, dated May 22, 2014.
Examination and Search Report for UAE Application No. 471/2014, dated Oct. 31, 2018.
Examiner's First Report for Australian Application No. 2012336027, dated May 6, 2016.
Examiner's Second Report for Australian Application No. 2012336027, dated Sep. 29, 2016.
Notice of Acceptance for Patent Application for Australian Application No. 2012336027, dated Mar. 29, 2017.
Examination Report for Australian Application No. 2017204786, dated Jul. 18, 2018.
Notice of Acceptance for Patent Application for Australian Application No. 2017204786, dated Jul. 15, 2019.
Examination Report for Australian Application No. 2019253897, dated Aug. 31, 2020.
First Office Action (Including Translation) for Chinese Application No. 201280066105.6, dated Jul. 28, 2015.
Second Office Action (Including Translation) for Chinese Application No. 201280066105.6, dated Feb. 2, 2016.
Third Office Action (Including Translation) for Chinese Application No. 201280066105.6, dated Aug. 26, 2016.
Notification to Grant Patent Right (Including Translation) for Chinese Application No. 201280066105.6, dated May 11, 2017.
First Office Action (Including Translation) for Chinese Patent Application No. 201710619658.4, dated Aug. 28, 2020.
Office Action (Including Translation) for Eurasian Application No. 201400556 dated Dec. 11, 2015.
Office Action (Including Translation) for Eurasian Application No. 201400556 dateed Apr. 13, 2017.
Office Action (Including Translation) for Eurasian Application No. 201400556 dated Apr. 17, 2018.
Office Action (Including Translation) for Eurasian Application No. 201400556 dated May 27, 2020.
Notice of Allowance for Eurasian Application No. 201400556 dated Aug. 12, 2020.
European Search Report for European Application No. 12847270.1, dated Jun. 29, 2015.
Examiner's Interview Summary for European Application No. 12847270.1, dated Jun. 26, 2017.
Intention to Grant for European Application No. 12847270.1, dated Jul. 4, 2017.
Intention to Grant for European Application No. 12847270.1, dated Nov. 27, 2017.
European Search Report for European Application No. 18178591.6, dated Nov. 7, 2018.
Intention to Grant for European Application No. 18178591.6, dated Oct. 9, 2019.
European Search Report for European Application No. 20163665.1, dated May 28, 2020.

(56) References Cited

OTHER PUBLICATIONS

Substantive Examination Report Stage 1 (Including Translation) for Indonesia Application No. P00201403239, dated Mar. 20, 2019.
Notice of Allowance (Including Translation) for Indonesia Application No. P00201403239, dated Oct. 31, 2019.
Office Action (Including Translation) for Israel Patent Application No. 232439, dated Aug. 14, 2017.
Notice of Allowance for Israel Patent Application No. 232439, dated Nov. 21, 2019.
Examination Report for Indian Patent Application No. 4237/CHENP/2014, dated Nov. 14, 2018.
Notice of Reasons for Rejection (Including Translation) for Japanese Patent Application No. 2014-540195, dated Aug. 2, 2016.
Decision to Grant (Including Translation) for Japanese Patent Application No. 2014-540195, dated Jan. 27, 2017.
First Office Action (Including Translation) for Korean Application No. 10-2014-7015429, dated Oct. 15, 2018.
First Office Action (Including Translation) for Korean Application No. 10-2014-7015429, dated Aug. 29, 2019.
First Office Action (Including Translation) for Korean Application No. 10-2019-7035245, dated Jan. 6, 2020.
Notice of Allowance (Including Translation) for Korean Application No. 10-2019-7035245, dated Jul. 27, 2020.
First Written Opinion for Singapore Application No. 11201402105S, dated Mar. 26, 2015.
Second Written Opinion for Singapore Application No. 11201402105S, dated Oct. 30, 2015.
Notice of Eligibility for Grant and Examination Report for Singapore Application No. 11201402105S, dated Jun. 7, 2016.
International Search Report for International Application No. PCT/US2014/072132, dated Apr. 1, 2015.
Written Opinion for International Application No. PCT/US2014/072132, dated Apr. 1, 2015.
International Preliminary Report on Patentability for International Application No. PCT/US2014/072132, dated Jul. 7, 2016.
Examination Report for Australian Patent Application No. 2014369919, dated Mar. 27, 2018.
Examination Report for Australian Patent Application No. 2014369919, dated Aug. 21, 2018.
Examination Report for Australian Patent Application No. 2019202115, dated Feb. 18, 2020.
Notice of Acceptance for Australian Patent Application No. 2019202115, dated Apr. 21, 2020.
Official Action (Including Translation) for Brazilian Application No. 11 2016 014663 8, dated Jul. 3, 2020.
First Office Action for Chinese Patent Application No. 201480070750.4, dated Feb. 2, 2019.
Second Office Action (Including Translation) for Chinese Patent Application No. 201480070750.4, dated Sep. 17, 2019.
European Search Report for European Application No. 14874737.1, dated Jul. 11, 2017.
Office Action (Including Translation) for Indonesian Application No. P00201604818, dated Jul. 19, 2019.
Office Action (Including Translation) for Israel Patent Application No. 246242, dated Nov. 5, 2018.
First Examination Report for Indian Application No. 201617024316, dated Feb. 24, 2020.
Notice of Reasons for Rejection (Including Translation) for Japanese Patent Application No. 2016-560881, dated Oct. 29, 2018.
Final Decision of Rejection for Rejection (Including Translation) for Japanese Patent Application No. 2016-560881, dated Jul. 1, 2019.
Notice of Reasons for Rejection (Including Translation) for Japanese Patent Application No. 2019-197499, dated Sep. 8, 2020.
International Search Report for International Application No. PCT/US2016/063039, dated Feb. 1, 2017.
Written Opinion for International Application No. PCT/US2016/063039, dated Feb. 1, 2017.
International Preliminary Report on Patentability for International Application No. PCT/US2016/063039, dated May 31, 2018.
Examination Report far Australian Application No. 2016357315, dated Apr. 8, 2020.
European Search Report for European Patent Application No. 16867324.2, dated May 14, 2019.
Office Action for European Patent Application No. 16867324.2, dated Jan. 29, 2020.
Office Action for U.S. Appl. No. 13/670,16 2, dated Apr. 2, 2015.
Office Action for U.S. Appl. No. 13/670,162, dated Nov. 5, 2015.
Office Action for U.S. Appl. No. 13/670,162, dated Aug. 12, 2016.
Office Action for U.S. Appl. No. 13/670,162, dated Jul. 28, 2017.
Office Action for U.S. Appl. No. 13/670,162, dated Apr. 19, 2018.
Examiner's Answer for U.S. Appl. No. 13/670,162, dated May 15, 2019.
Office Action for U.S. Appl. No. 14/580,585, dated Oct. 8, 2015.
Office Action for U.S. Appl. No. 14/580,585, dated Apr. 21, 2016.
Office Action for U.S. Appl. No. 14/580,585, dated Apr. 12, 2017.
Office Action for U.S. Appl. No. 14/580,585, dated Dec. 28, 2017.
Office Action for U.S. Appl. No. 14/580,585, dated May 31, 2019.
Notice of Allowance for U.S. Appl. No. 14/580,585, dated Jan. 8, 2020.
Office Action for U.S. Appl. No. 16/849,087, dated Aug. 6, 2020.
Office Action for U.S. Appl. No. 15/358,060, dated Apr. 11, 2018.
Office Action for U.S. Appl. No. 15/358,060, dated Jan. 10, 2019.
Notice of Allowance (Including Translation) for Indonesian Application No. P00201604818, dated Nov. 20, 2020.
Office Action (Including Translation) for Korean Application No. 10-2016-7020070, dated Nov. 10, 2020.
Office Action for European Patent Application No. 16867324.2, dated Oct. 13, 2020.
Office Action for U.S. Appl. No. 13/670,162, dated Dec. 16, 2020.
Notice of Allowance received for U.S. Appl. No. 14/580,585 dated Jan. 8, 2020, 22 pages.
Non Final Office Action received for U.S. Appl. No. 16/849,087 dated Aug. 6, 2020, 28 pages.
Final Office Action received for U.S. Appl. No. 16/849,087 dated Apr. 1, 2021, 35 pages.
Non Final Office Action received for U.S. Appl. No. 16/849,087 dated Sep. 16, 2021, 18 pages.
Final Office Action received for U.S. Appl. No. 16/849,087 dated Jun. 16, 2022, 15 pages.

* cited by examiner

VIRTUAL RADIO ACCESS NETWORK USING SOFTWARE-DEFINED NETWORK OF REMOTES AND DIGITAL MULTIPLEXING SWITCHES

CROSS-REFERENCES TO RELATED APPLICATIONS

This application is a continuation of U.S. patent application Ser. No. 15/358,060, filed Nov. 21, 2016, which claims the benefit of U.S. Provisional Patent Application No. 62/258,289, filed Nov. 20, 2015. U.S. patent application Ser. No. 15/358,060 is also a continuation-in-part of U.S. patent application Ser. No. 14/580,585, filed Dec. 23, 2014, entitled "Digital Multiplexer in a Distributed Antenna System", which claims priority to U.S. Provisional Patent Application No. 61/920,397, filed Dec. 23, 2013, entitled "Digital Multiplexer in a Distributed Antenna System". Each of these applications are hereby incorporated by reference in their entirety for all purposes.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. One of the most difficult challenges faced by network operators is caused by the physical movement of subscribers from one location to another, and particularly when wireless subscribers congregate in large numbers at one location. A notable example is a business enterprise facility during lunchtime, when a large number of wireless subscribers visit a cafeteria location in the building. At that time, a large number of subscribers have moved away from their offices and usual work areas. It's likely that during lunchtime there are many locations throughout the facility where there are very few subscribers. If the indoor wireless network resources were properly sized during the design process for subscriber loading as it is during normal working hours when subscribers are in their normal work areas, it is very likely that the lunchtime scenario will present some unexpected challenges with regard to available wireless capacity and data throughput.

To address these issues, Distributed Antenna Systems (DAS) have been developed and deployed. Despite the progress made in DAS, there is a need in the art for improved methods and systems related to DAS.

SUMMARY OF THE INVENTION

The present invention generally relates to wireless communication systems employing Distributed Antenna Systems (DAS) as part of a distributed wireless network. More specifically, the present invention relates to a DAS utilizing software defined radio (SDR). Wireless and mobile network operators face the continuing challenge of building networks that effectively manage high data-traffic growth rates. Mobility and an increased level of multimedia content for end users typically employs end-to-end network adaptations that support new services and the increased demand for broadband and flat-rate Internet access. Distributed Antenna Systems (DAS) provide a mechanism to route signals to various antennas that are distributed over a given geographical area. The signals typically originate from a base transceiver station (BTS), also referred to as a base station, at RF frequencies or digitally from a Baseband Unit (BBU). The BBU is part of a distributed Base Station system, whereby the Radio Unit (RU) is physically separated from the BBU. This kind of distributed architecture can increase flexibility of networking and decrease the cost of maintaining a network. Some common interface standards between the BBU and RU are OBSAI (Open Base Station Architecture Initiative), CPRI (Common Public Radio Interface) and ORI (Open Radio Interface). The cellular payload data is transported between a plurality of BBUs and RUs at a high data rate. The BBU framed data is comprised of: payload IQ data, Control and Management (C&M) information, carrier frequency, signal bandwidth, etc. A common DAS platform that interfaces between both BBUs, at baseband, and BTSs, at RF, will simplify the distributed antenna system architecture.

According to some embodiments of the present invention, a system is provided. The system comprises a fronthaul interface including a plurality of DMUs. Each DMU of the plurality of DMUs is configured to receive a plurality of signals from a BBU, extract a subset of the plurality of signals, aggregate the subset of the plurality of signals into a stream, and route the stream to one or more DRUs of a plurality of DRUs.

According to some embodiments of the present invention, a method is provided. The method comprises receiving, at a DMU, a plurality of signals from a BBU. The method further comprises extracting a subset of the plurality of signals. The method further comprises aggregating the subset of the plurality of signals into a stream. The method further comprises routing the stream to one or more DRUs of a plurality of DRUs.

According to an embodiment of the present invention, a system for routing signals in a Distributed Antenna System (DAS) is provided. The system includes one or more Base Band Units (BBUs). Each of the one or more BBUs has one or more digital outputs. The system also includes a plurality of Digital Multiplexer Units (DMUs) coupled to each other and operable to route signals between the plurality of DMUs. Each of the plurality of DMUs is operable to receive one or more digital inputs from the one or more BBUs. The system further includes a plurality of Digital Remote Units (DRUs) coupled to the plurality of DMUs and operable to transport signals between the plurality of DRUs and one or more of the plurality of DMUs.

According to another embodiment of the present invention, a method for routing signals in a Distributed Antenna System (DAS) including a plurality of Digital Multiplexer Units (DMUs) and a plurality of Digital Remote Units (DRUs) is provided. The method includes receiving, at ports of the plurality of DMUs, digital signals from sector ports of one or more Base Band Units (BBUs). The method also includes routing the digital signals between the plurality of DMUs and transporting the digital signals between the plurality of DMUs and a plurality of DRUs.

According to a specific embodiment of the present invention, a Distributed Antenna System (DAS) is provided. The DAS includes a plurality of Digital Multiplexer Units (DMUs) coupled to each other and operable to route signals between the plurality of DMUs. Each of the plurality of DMUs includes a plurality of digital input ports operable to receive digital inputs from one or more of a plurality of BBUs. Each of the plurality of BBUs includes a plurality of digital output ports. The DAS also includes a plurality of Digital Access Units (DAUs) coupled to each other and operable to route signals between the plurality of DAUs.

Each of the plurality of DAUs includes a plurality of analog input ports operable to receive analog RF inputs from one of more of a plurality of BTSs. Each of the plurality of BTSs includes a plurality of analog RF output ports. The DAS further includes a plurality of Digital Remote Units (DRUs) coupled to the plurality of DMUs and operable to transport signals between DRUs and DMUs, each of the plurality of DRUs including a remote antenna.

According to a particular embodiment of the present invention, a system for routing signals in a Distributed Antenna System is provided. The system includes a plurality of Digital Multiplexer Units (DMUs). The plurality of DMUs are coupled and operable to route signals between the plurality of DMUs. The system also includes a plurality of Digital Remote Units (DRUs) coupled to the plurality of DMUs and operable to transport signals between DRUs and DMUs, a plurality of Base Band Units (BBU) with digital connections to the plurality of DMUs and operable to route signals between the plurality of DMUs and the plurality of digital connections.

According to another embodiment of the present invention, a system is provided. The system comprises a core network, a data center in communication with the core network, and a plurality of digital remote units (DRUs) in communication with the data center. The data center comprises a plurality of baseband units (BBUs) and a plurality of digital multiplexing units (DMUs). The plurality of DMUs are configured to route I/Q data to one or more of the plurality of DRUs. Control and management (C&M) functionality of each DMU and DRU is located in a cloud network.

Numerous benefits are achieved by way of the present invention over conventional techniques. For example, embodiments of the present invention provide methods and systems that utilize system elements with reduced hardware requirements (e.g., radio units in BTSs and radio units in DAUs), thereby reducing system cost, reducing system power consumption, and reducing system size. Additionally, embodiments described herein reduce or remove the requirement to perform RF to digital conversion and digital to RF conversion, thereby reducing signal degradation. These and other embodiments of the invention along with many of its advantages and features are described in more detail in conjunction with the text below and attached figures.

BRIEF DESCRIPTION OF THE DRAWINGS

Further objects and advantages of the present invention can be more fully understood from the following detailed description taken in conjunction with the accompanying drawings in which.

DETAILED DESCRIPTION OF THE INVENTION

Figure 1:
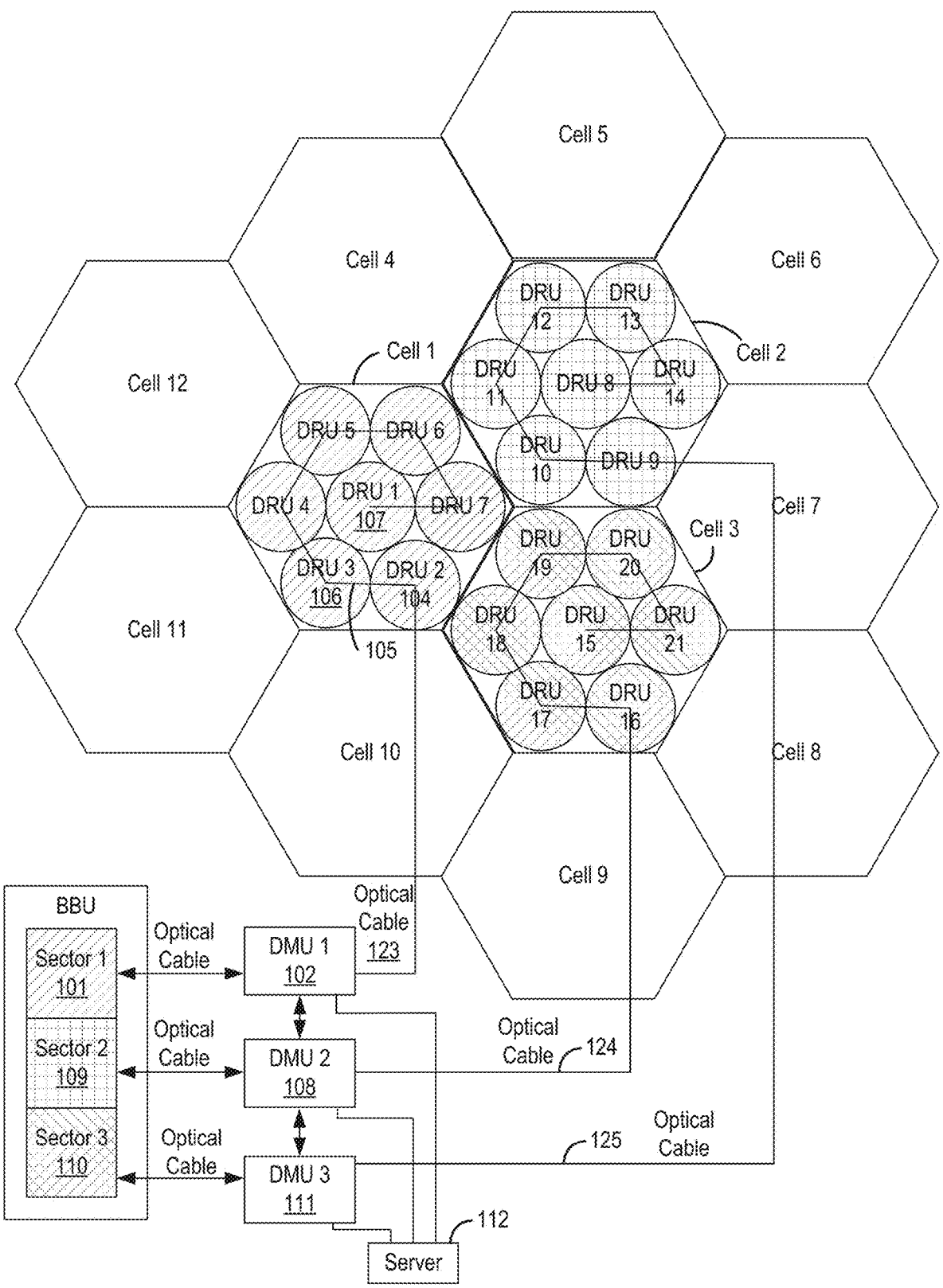
FIG. 1 is a block diagram according to one embodiment of the invention showing the basic structure and an example of the transport routing based on having a single 3 sector BBU with 3 DMUs and 7 DRUs daisy chained together for each cell.

A distributed antenna system (DAS) provides an efficient means of utilization of base station resources. The base station or base stations associated with a DAS can be located in a central location and/or facility commonly known as a base station hotel. A traditional DAS network includes one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs. A typical base station comprises 3 independent radio resources, commonly known as sectors. These 3 sectors are typically used to cover 3 separate geographical areas without creating co-channel interference between users in the 3 distinct sectors.

A Distributed Base Station Architecture involves the use of Base Band Units (BBUs) and many remotely located Radio Units (RUs). A number of standards exist for interfacing BBUs to RUs, some examples are OBSAI (Open Base Station Architecture Initiative), CPRI (Common Public Radio Interface) and ORI (Open Radio Interface). Traditionally, a Distributed Base Station Architecture and a Distributed Antenna System (DAS) do not coexist on the same system. Typically, the distributed Base Station Architecture involves vendor specific infrastructure and cannot accommodate remote radio unit sharing. This poses a problem when venues have requirements that limit the number of antennas and remote units because of issues such as space constraints, esthetics constraints, etc. Infrastructure sharing is a means of reducing the number visible vendor specific units in a given outdoor or indoor venue. A Distributed Antenna System is preferably vendor and modulation agnostic in order to accommodate all the different vendor specific interfaces. Capturing the signals from the various vendor BTSs at RF is a means of ensuring that the DAS system will be agnostic. However, an active DAS system will digitize the RF signals and transport them to the remote units, whereby they will be translated back to RF. A Digital Access Unit (DAU) is the host unit that accepts the RF signals from the various BTSs.

The BTS includes a BBU and a collocated Radio Unit. The various Radio Units of multiple vendor BTSs interface to the DAUs at RF. A more efficient process would be to utilize a Digital Multiplexer Unit (DMU) that digitally interfaces directly to the vendor BBUs. This architecture would eliminate the requirement of the BTS to translate the signal to RF and then have the DAU translate the signal back to digital baseband. The net effect would be to remove any impairment that occurs through the translation process in addition to reducing the power consumption of this additional step. This DMU would be able to interface to the various vendor BBUs. The DMU serves another key function; it collates the various operator channels onto a single data stream that is sent to the various remote units. The remote unit radio channels are shared amongst the various operators. The reverse operation would occur in the DMU, whereby the received uplink signals from the various remote units are transported back to the DMU and then distributed to a specific BBU. An additional feature of the DMU is that it can interface to DAUs when a system has legacy BTS equipment that requires an RF interface.

An embodiment shown in FIG. 1 illustrates a basic DAS network architecture according to an embodiment of the present invention and provides an example of a data transport scenario between a 3 sector BBU and multiple DRUs. In this embodiment, the DRUs are daisy chained together to achieve coverage in a specific geographical area. Each individual sector covers an independent geographical area, which is identified as a Cell.

FIG. 1 depicts a DAS system employing multiple Digital Remote Units (DRUs) and multiple Digital Multiplexer Units (DMUs). In accordance with the present invention, each DRU provides unique header information associated with each DRU which uniquely identifies uplink data received by that particular Digital Remote Unit.

One feature of embodiments of the present invention is the ability to route Base Station radio resources among the DRUs or group(s) of DRUs. In order to route radio resources available from one or more Base Stations, it is desirable to configure the individual router tables of the DMUs and DRUs in the DAS network.

The DMUs 102, 108, and 111 are networked together to facilitate the routing of DRU signals among the multiple DMUs. The DMUs support the transport of the RF downlink and RF uplink signals between the BBU and the DRUs. This architecture enables the various base band unit signals to be transported simultaneously or concurrently to and from multiple DRUs. PEER ports are used for interconnecting DMUs and interconnecting DRUs in some embodiments.

The DMUs have the capability to control the gain (in small increments over a wide range) of the downlink and uplink signals that are transported between the DMU and the base band unit (or base band units) connected to that DMU. This capability provides flexibility to simultaneously control the uplink and downlink connectivity of the path between a particular DRU (or a group of DRUs via the associated DMU or DMUs) and a particular base band unit sector.

Embodiments of the present invention use router tables to configure the networked DMUs. The local router tables establish the mapping of the inputs to the various outputs. Internal Merge blocks are utilized for the Downlink Tables when the inputs from an External Port and a PEER Port need to merge into the same data stream. Similarly, Merge blocks are used in the Uplink Tables when the inputs from the LAN Ports and PEER Ports need to merge into the same data stream.

The remote router tables establish the mapping of the inputs to the various outputs. Internal Merge blocks are utilized for the Downlink Tables when the inputs from a LAN Port and a PEER Port need to merge into the same data stream. Similarly, Merge blocks are used in the Uplink Tables when the inputs from the External Ports and PEER Ports need to merge into the same data stream.

As shown in FIG. 1, the individual base band unit sector's radio resources are transported to a daisy-chained network of DRUs. Each individual sector's radio resources provide coverage to an independent geographical area via the networked DRUs. FIG. 1 demonstrates how three cells, each cell comprising an independent network of 7 DRUs, provide coverage to a given geographical area. A server 112 is utilized to control the switching function provided in the DAS network. Referring to FIG. 1 and by way of example, DMU 1 (102) receives digital downlink signals from BBU Sector 1 (101). DMU 1 collates the baseband signals from the other DMUs onto a serial stream and the optical fiber cable 123 transports the desired digital signals to DRU 2 (104). Optical cable 105 transports all the digital optical signals to DRU 3 (106). The other DRUs in the daisy chain are involved in passing the optical signals onward to DRU 1 (107). Thus, embodiments of the present invention provide the ability to receive digital signals from a plurality of sectors of a BBU of a base station (e.g., Sector 1 (101), Sector 2 (109), and Sector 3 (110). The digital signals are received by one or more DMUs, which are connected to each other and controlled by server 112 so that the digital signals can be routed between the DMUs. The digital signals, which may be processed at the DMU, are then routed to the digital remote units, illustrated by DRU1 through DRU21 in FIG. 1.

DMU 1 (102) is networked with DMU 2 (108) and DMU 3 (111) to allow the downlink signals from Sector 2 (109) and Sector 3 (110) to be transported to all the DRUs in Cell 1. The system's switching and routing functions enable the selection of which sectors' signals are transmitted and received by each DRU. DMU 2 (108) is connected to Cell 3 (DRUs 15-21) using optical cable 124 and DMU 3 (111) is connected to Cell 2 (DRUs 8-14) using optical cable 125.

Because the DMUs receive digital signals from the base band units, for example, over optical fiber, although other communications media can be used, they are able to process the received digital signals and transmit digital signals to the DRUs for broadcast as RF signals to users. Although embodiments of the present invention discuss receiving and transmitting digital signals, it is not necessary that these digital signals be identical since processed versions of received digital signals can be transmitted, which can also be referred to as digital signals. As an example, digital signals can be received at DMU 1 (102) from sector 1 (101) as well as from Sector 2 (109) through DMU 2 (108). These digital signals can be combined into a single digital signal for transport to Cell 1. Thus, although the specification and claims refer to digital signals at various stages of the communication process, it is not required that these digital signals are identical. One of ordinary skill in the art would recognize many variations, modifications, and alternatives.

As illustrated in FIG. 1, the DMUs receive digital signals from the sectors of the BBU, and then direct those digital signals to the various DRUs. It should be noted that although embodiments of the present invention discuss receiving a digital signal, for example, from a BBU, and transmitting the digital signal to the DRUs, for example, through the DMU, the digital signal that is transmitted to the DRUs does not have to be identical to the digital signal that is received from the BBU. As an example, as discussed above, multiple signals from multiple sectors can be combined at the DMU for transmission of the combined signal to the DRUs. Additional description related to DAS are provide in U.S. Patent Application Publication No. 2013/0114963, published on May 9, 2014, the disclosure of which is hereby incorporated by reference in its entirety for all purposes.

Figure 2:
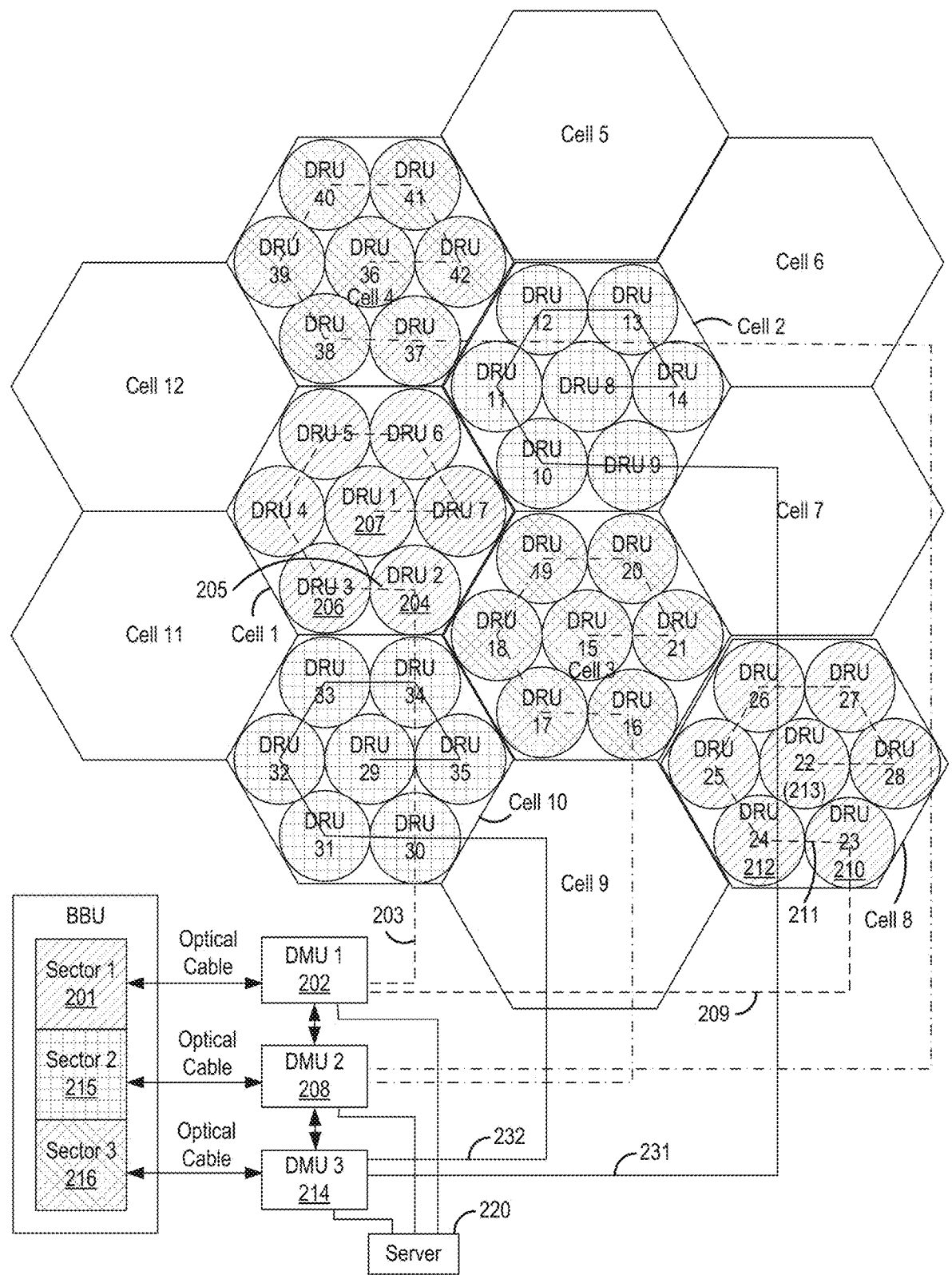
FIG. 2 is a block diagram according to one embodiment of the invention showing the basic structure for a frequency reuse pattern of N=1 and an example of the transport routing based on having a single 3 sector BBU with 3 DMUs and 7 DRUs daisy chained together for each cell.

FIG. 2 shows an embodiment illustrating how a single BBU can be used to provide coverage for a larger geographical area when a frequency reuse pattern of N=1 is used. Referring to FIG. 2, cell 1 and cell 8 would share the radio resources of sector 1 (201) of the BBU. Similarly, cell 2 and cell 10 would share the radio resources of sector 3 (216), which are connected to DMU 214 via optical cables 231 and 232, respectively.

The DMUs control the routing of data between the BBU and the DRUs. Each individual data packet is provided with a header that uniquely identifies which DRU it is associated with. The DMUs are interconnected, for example, using optical fiber, to allow transport of data among multiple DMUs. This feature provides the unique flexibility in the DAS network to route signals between the sectors of a BBU and the individual DRUs. A server 220 is utilized to control the switching function provided in the DAS network.

Referring to FIG. 2, and by way of example, DMU 1 (202) receives downlink signals from BBU 1 Sector 1 (201). DMU 1 collates the baseband signals from the other DMUs onto a serial stream and the optical fiber cable 203 transports the desired signals to DRU 2 (204) in Cell 1. Optical cable 205 transports all the optical signals to DRU 3 (206). The other DRUs in the daisy chain are involved in passing the optical signals onward to DRU 1 (207). DMU 1 (202) is networked with DMU 2 (208) and DMU 3 (214) to allow the downlink signals from Sector 2 and Sector 3 to be transported to all the DRUs in Cell 1.

Similarly for Cell 8, optical fiber cable 209 transports the desired signals from DMU 1 (202) to DRU 23 (210). Optical cable 211 transports all the optical signals to DRU 24 (212). The other DRUs in the daisy chain in Cell 8 are involved in passing the optical signals onward to DRU 22 (213). Because of frequency reuse, DMU 1 (202) is able to pass signals to multiple cells in a star configuration as illustrated in FIG. 2 via the multiple optical cables connected to the multiple optical outputs of the DMUs.

Figure 3:
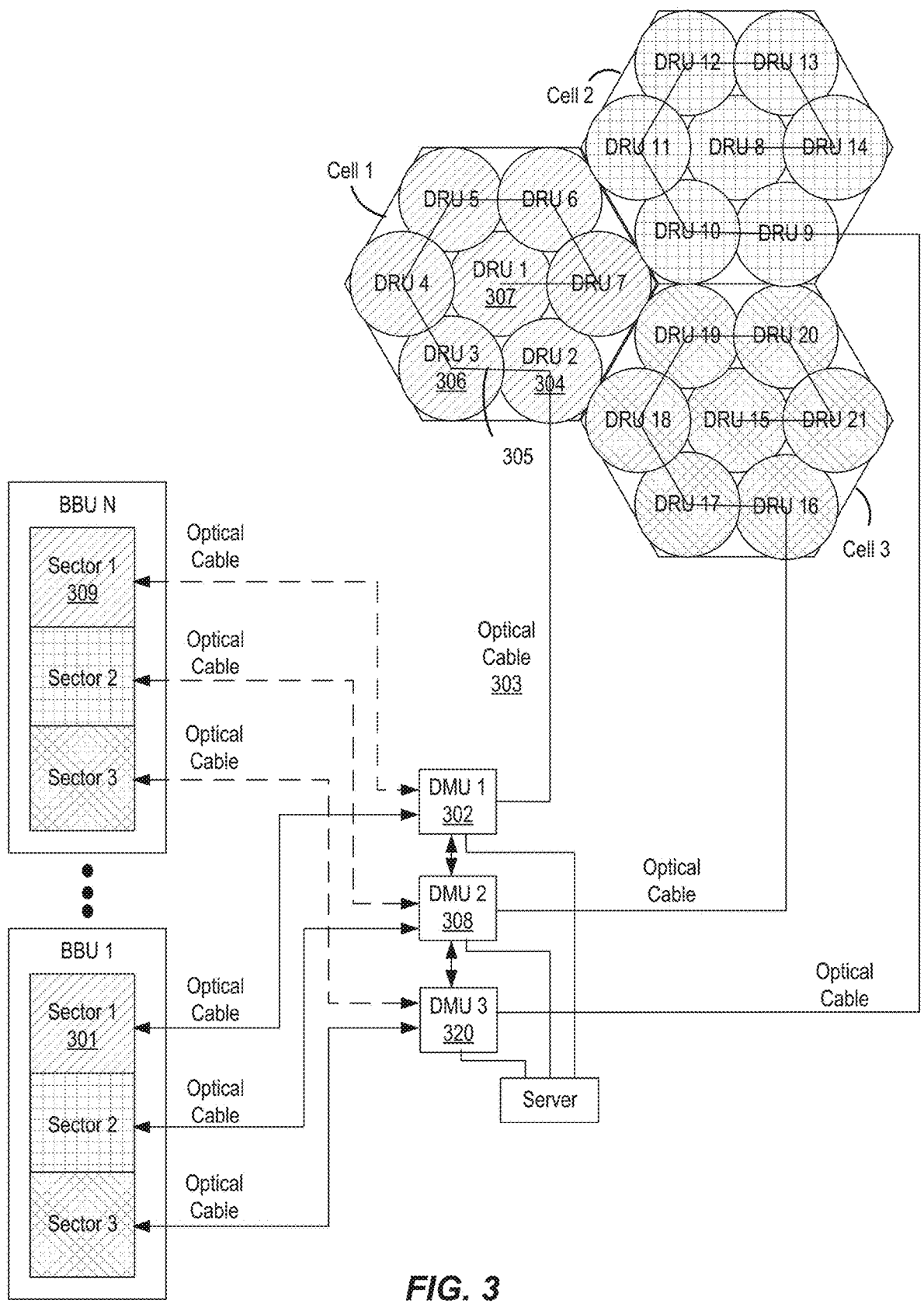
FIG. 3 is a block diagram according to one embodiment of the invention showing the basic structure and an example of the transport routing based on having multiple 3 sector BBUs with 3 DMUs and 7 DRUs daisy chained together for each cell.

FIG. 3 shows an embodiment illustrating an application employing a BBU hotel where N BBUs are interconnected to serve a given geographical area. The BBUs may represent independent wireless network operators and/or multiple interface standards (CPRI, OBSAI, ORI, etc.). As illustrated in FIG. 3, multiple three-sector BBUs are connected to a daisy chained DAS network in which each DMU utilizes multiple optical inputs and a single optical output connected to a given cell. Thus, different operators or different bands can be represented by the different sectors of a BBU. Although it is not illustrated in FIG. 3 for purposes of clarity, the DMUs can have multiple inputs as illustrated in FIG. 3 as well as multiple outputs as illustrated in FIG. 2. Accordingly, multiple input applications in which multiple digital inputs from different BBUs are received and multiple output applications in which multiple digital outputs are provided at the DMU are included within the scope of the present invention.

Referring to FIG. 3 and by way of example, DMU 1 (302) receives downlink signals from BBU Sector 1 (301). DMU 1 (302) transports the desired signals to DRU 2 (304). Optical cable 305 transports all the optical signals to DRU 3 (306). The other DRUs in the daisy chain are involved in passing the optical signals onward to DRU 1 (307). DMU 1 (302) is networked with DMU 2 (308) to allow the downlink signals from BBU 1 Sector 2 (320) to be transported to all the DRUs in Cell 1. DMU 1 (302) receives downlink signals from BBU Sector N (309). DMU 1 (302) collates all the downlink signals from the various BBUs and DMUs.

In order to efficiently utilize the limited BBU resources, the network of DRUs should have the capability of re-directing their individual uplink and downlink signals to and from any of the BBU sectors. Because the DRUs data traffic has unique streams, the DMU Router has the mechanism to route the signal to different BBUs.

Figure 4:
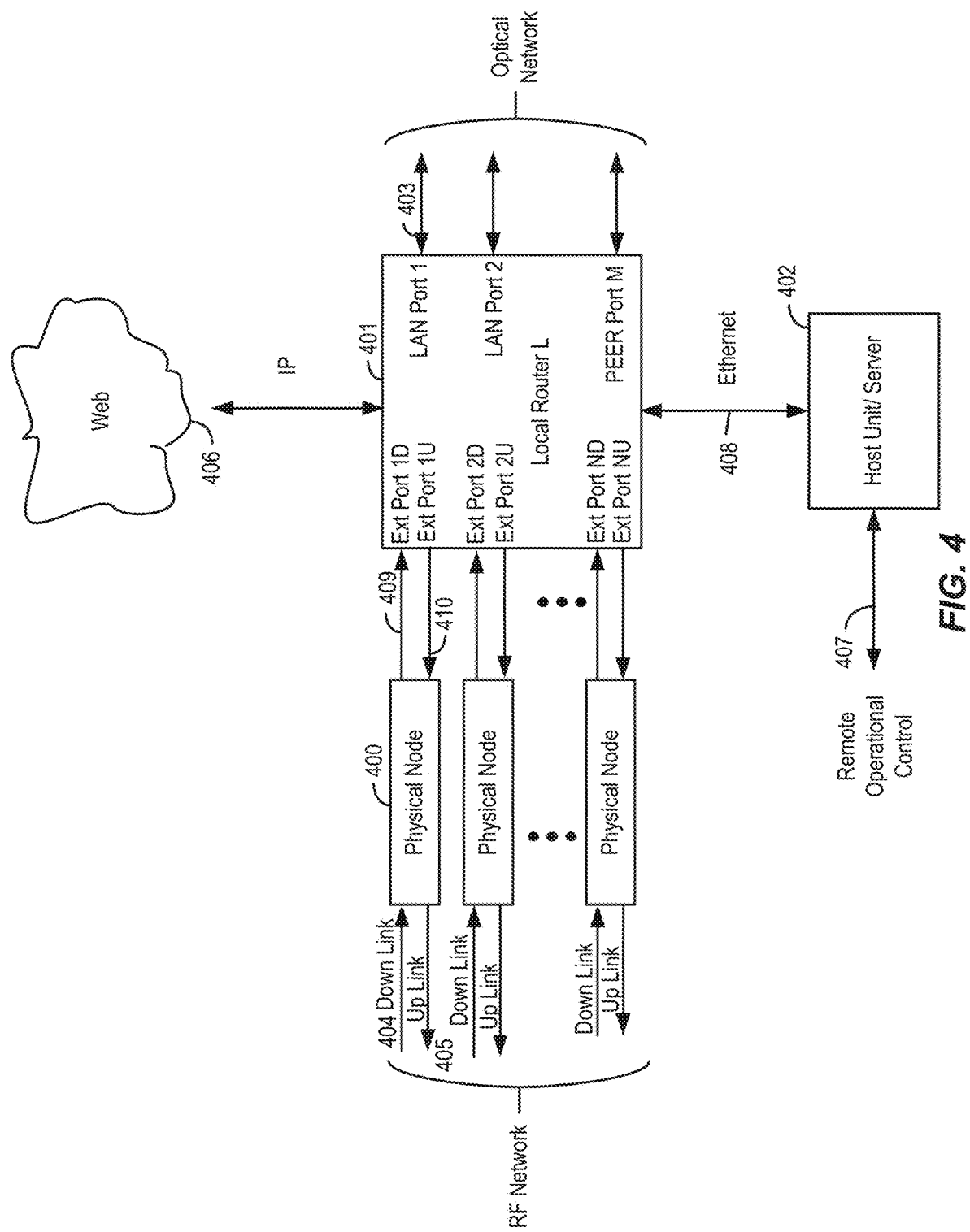
FIG. 4 is a block diagram of a Digital Access Unit (DAU), which contains Physical Nodes and a Local Router according to an embodiment of the present invention.

FIG. 4 shows the 2 primary elements in a DAU, the Physical Nodes (400) and the Local Router (401). The Physical Nodes translate the RF signals to baseband for the Downlink and from baseband to RF for the Uplink. The Local Router directs the traffic between the various LAN Ports, PEER Ports and the External Ports. The physical nodes connect to the BTS at radio frequencies (RF). The physical nodes can be used for different operators, different frequency bands, different channels, or the like. The physical nodes can combine the downlink and uplink signals via a duplexer or they can keep them separate, as would be the case for a simplex configuration. In comparison with the DMU illustrated in FIG. 8, the physical nodes 400 are not utilized in the DMU illustrated in FIG. 8 in some embodiments.

FIG. 4 shows an embodiment of the DAU whereby the physical nodes have separate outputs for the uplinks (405) and separate inputs for the downlink paths (404). The physical node translates the signals from RF to baseband for the downlink path and from baseband to RF for the uplink path. The physical nodes are connected to a Local Router via external ports (409,410)). The router directs the uplink data stream from the LAN and PEER ports to the selected External U (uplink) ports. Similarly, the router directs the downlink data stream from the External D (downlink) ports to the selected LAN and PEER ports.

In one embodiment, the LAN and PEER ports are connected via an optical fiber to a network of DMUs and DRUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU can also connect directly to the Remote Operational Control center (407) via the Ethernet port. Additional description related to DAUs is provided in U.S. Patent Application Publication No. 2013/0114963, incorporated by reference above.

Figure 5:
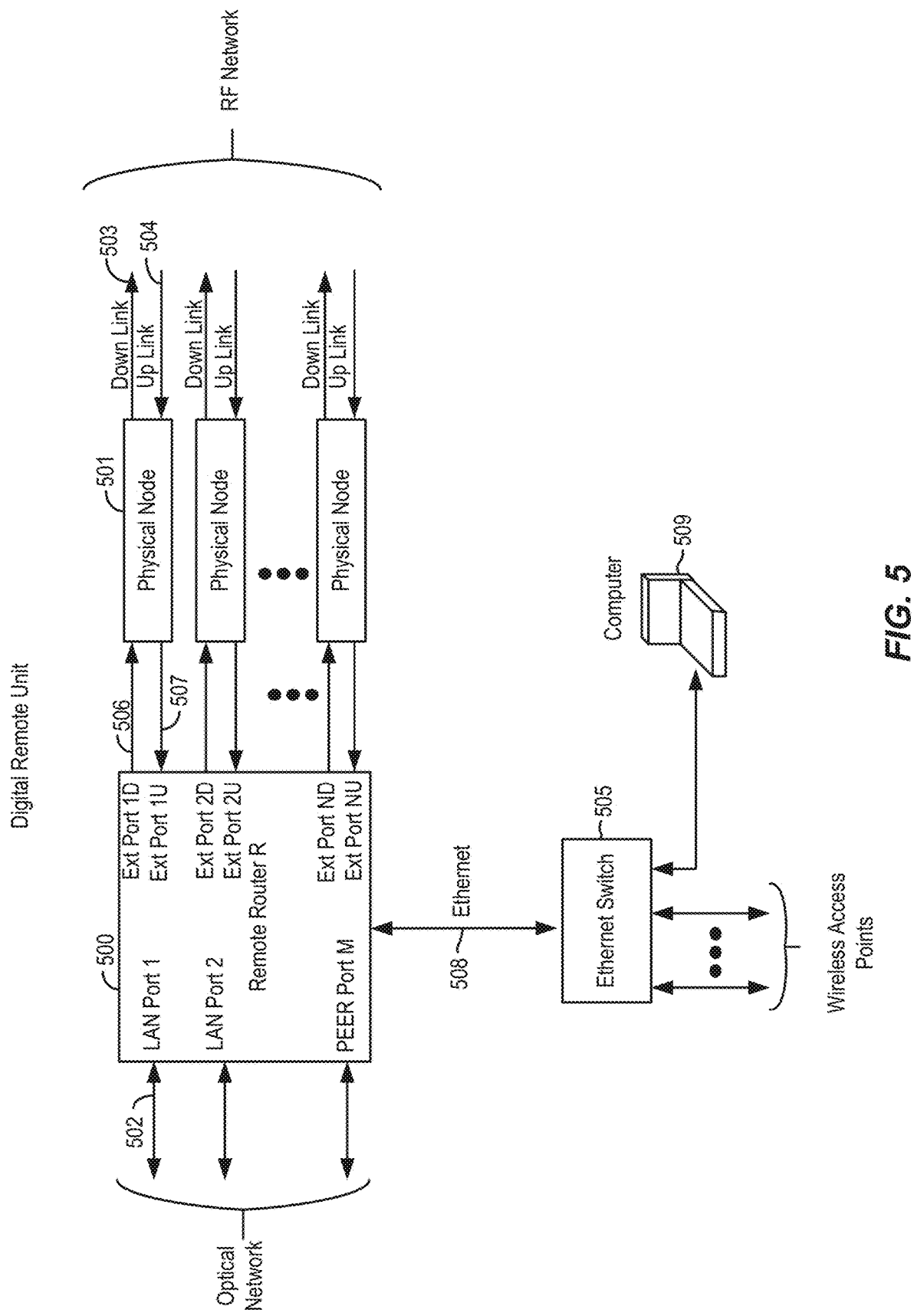
FIG. 5 is a block diagram of a Digital Remote Unit (DRU) according to an embodiment of the present invention.

FIG. 5 shows the 2 primary elements in a DRU, the Physical Nodes (501) and the Remote Router (500). The DRU includes both a Remote Router and Physical Nodes. The Remote Router directs the traffic between the LAN ports, External Ports and PEER Ports. The physical nodes connect to the BTS at radio frequencies (RF). The physical nodes can be used for different operators, different frequency bands, different channels, etc. FIG. 5 shows an embodiment whereby the physical nodes have separate inputs for the uplinks (504) and separate outputs for the downlink paths (503). The physical node translates the signals from RF to baseband for the uplink path and from baseband to RF for the downlink path. The physical nodes are connected to a Remote Router via external ports (506,507). The router directs the downlink data stream from the LAN and PEER ports to the selected External D ports. Similarly, the router directs the uplink data stream from the External U ports to the selected LAN and PEER ports. The DRU also contains a Ethernet Switch (505) so that a remote computer or wireless access points can connect to the internet. Additional description related to DRUs is provided in U.S. Patent Application Publication No. 2013/0114963, incorporated by reference above.

Figure 6:
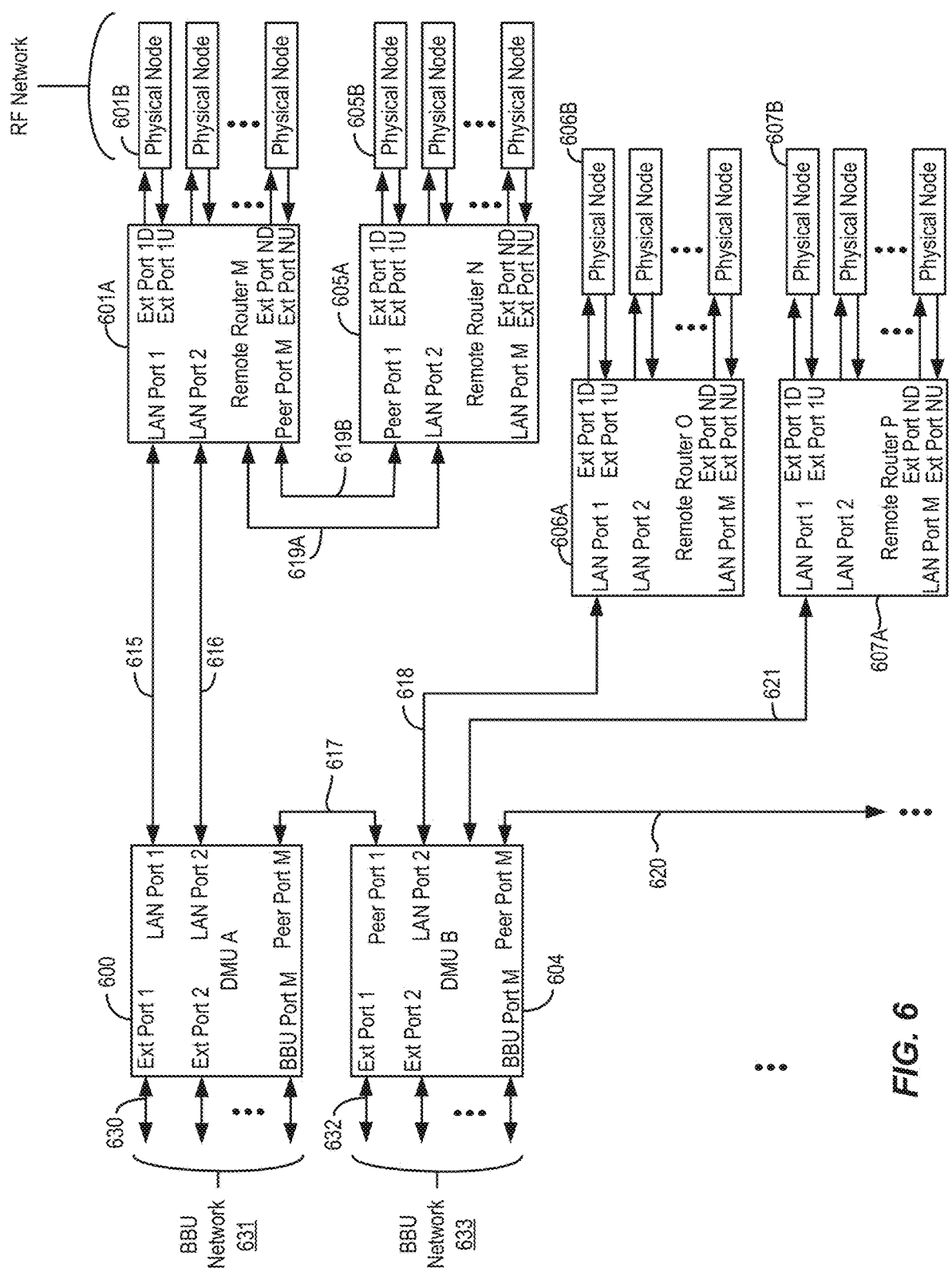
FIG. 6 depicts a typical topology where multiple Local Routers (DMUs and DAUs) are interconnected with multiple Remote Routers according to an embodiment of the present invention.
Figure 6:
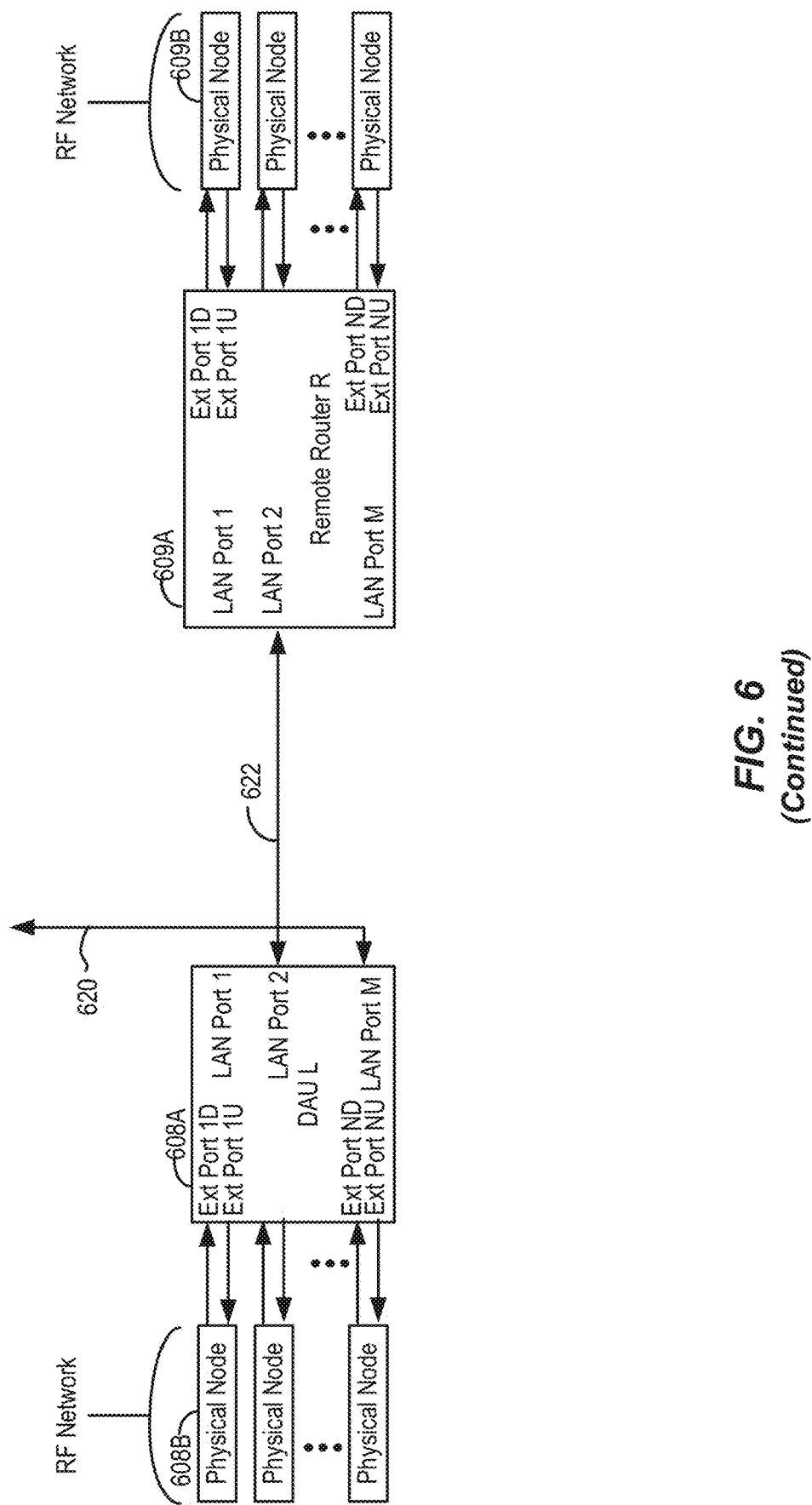

FIG. 6 depicts a DAS network that includes multiple DMUs, one or more DAUs, and multiple DRUs in an DMU and DAU network topology. The Local Routers, illustrated by DMU A and DMU B, and DAU L, are shown in a Daisy Chain configuration. Although a single DAU is illustrated for purposes of clarity, additional DAUs can be utilized in this implementation. The Remote Routers, illustrated by portions of DRUs 601, 605, 606, 607, and 609, are shown in a star and/or daisy chain configuration. By comparison with FIG. 5, it can be seen that the remote router 601A and the physical node 601B are both components of the DRU. The local routers in the DMUs and DAUs can be interconnected via a PEER port, illustrated by optical cables 617 and 620. The Local routers can connect to the remote routers in the DRUs via an optical, copper, or other suitable connection. The remote routers in the DRUs can be connected in a daisy chain configuration with other DRUs or they may be connected with a local router via a star configuration. The PEER ports in a DMU are used when there is no direct connection between a physical node connected to a local router (e.g., DMU) and a physical node connected to a remote router (e.g., DRU). PEER ports at the DRU are used for daisy chaining between two or more DRUs. DMUs 600/604 receive digital signals from BBU networks 631/633 via optical cables 630/632. DMU 600 is connected to DRU 601 via optical cable 615 and 616. DRU 605 is connected to DRU 605 via optical cables 619A and 619B. DMU 604 is connected to DRUs 606 and 607 in a star configuration using optical cables 618 and 621. DAU 608 is connected to DRU 609 via optical cable 622.

Figure 7:
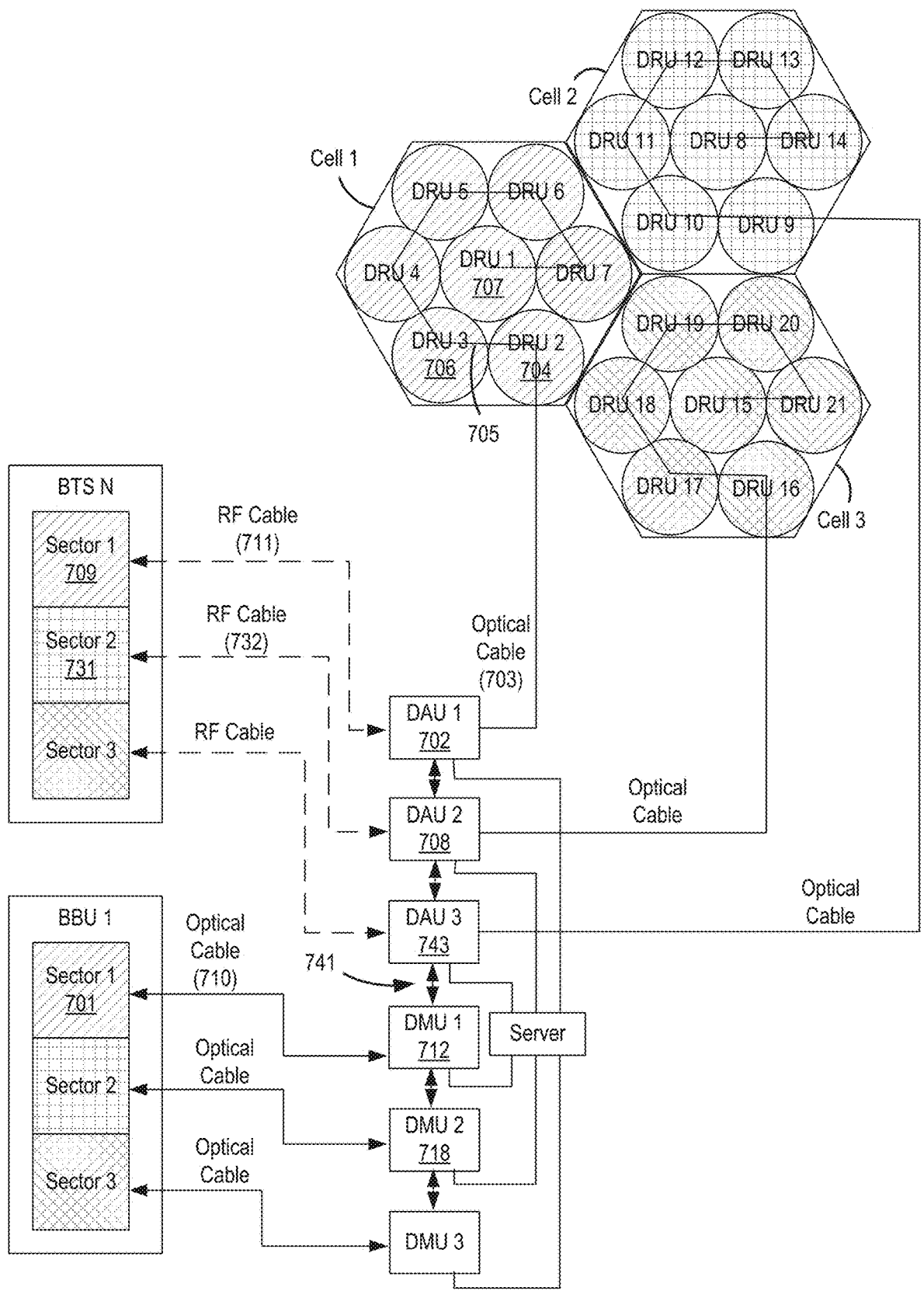
FIG. 7 shows a block diagram of the interconnection between a BTS to DAUs and a BBU to DMUs.

FIG. 7 shows an embodiment illustrating an application employing a base station/base band unit hotel where multiple BTSs and BBUs can be interconnected to serve a given geographical area. As will be evident to one of skill in the art, FIGS. 6 and 7 provide illustrations of related network topologies in which digital signals are received by DMUs 600/604 from BBUs via optical cables and RF signals are received by DAU(s) 608 from BTSs via RF cables. In the embodiment illustrated in FIG. 7, one or more three-sector BTSs and one or more three-sector BBUs can be connected to a Daisy Chained DAS network. The BBUs may represent independent wireless network operators, multiple bands, and/or multiple interface standards (CPRI, OBSAI, ORI, etc.). The BTSs may represent independent wireless network operators and interface with DAUs at RF. Referring to FIG. 7 and by way of example, DAU 1 (702) receives downlink signals from BTS N Sector 1 (709) via RF cable 711. DAU 1 (702) transports the desired signals to DRU 2 (704) via optical cable 703. Optical cable 705 transports all the optical signals to DRU 3 (706). The other DRUs in the daisy chain are involved in passing the optical signals onward to DRU 1 (707). DAU 1 (702) is networked with DAU 2 (708) to allow the downlink signals from BTS N Sector 2 to be transported to all the DRUs in Cell 1. DAU 2 (708) receives downlink signals from BTS Sector N (709) via DAU 1 as well as from BTS Sector 2 (931) via RF cable 732.

DMU 1 (712) interfaces to BBU 1 sector 1 (701). DMU 1 is interconnected with DAU 3 743 via optical cable 741. The networking of the DAUs to the DMUs provides a mechanism to collate signals from BTSs with signals from BBUs. Accordingly, analog RF signals from the BTS(s) and digital optical signals from the BBU(s) can be routed to desired DRUs using the topology illustrated in FIG. 7.

As illustrated in FIG. 7, analog signals from BTSs and digital signals from BBUs can be received by the DAS network by using DAUs and DMUs, respectively. Accordingly, the DAS system provided by embodiments of the present invention can be considered as input signal agnostic, since it can receive digital inputs from the BBU networks as well as analog RF inputs from the BTS and then communicate those signals through the system to the remote antennas. Of course, in the uplink path, the system can receive inputs at the remote antennas and then communicate those signals in either digital or analog format to the BBUs or DAUs.

Figure 8:
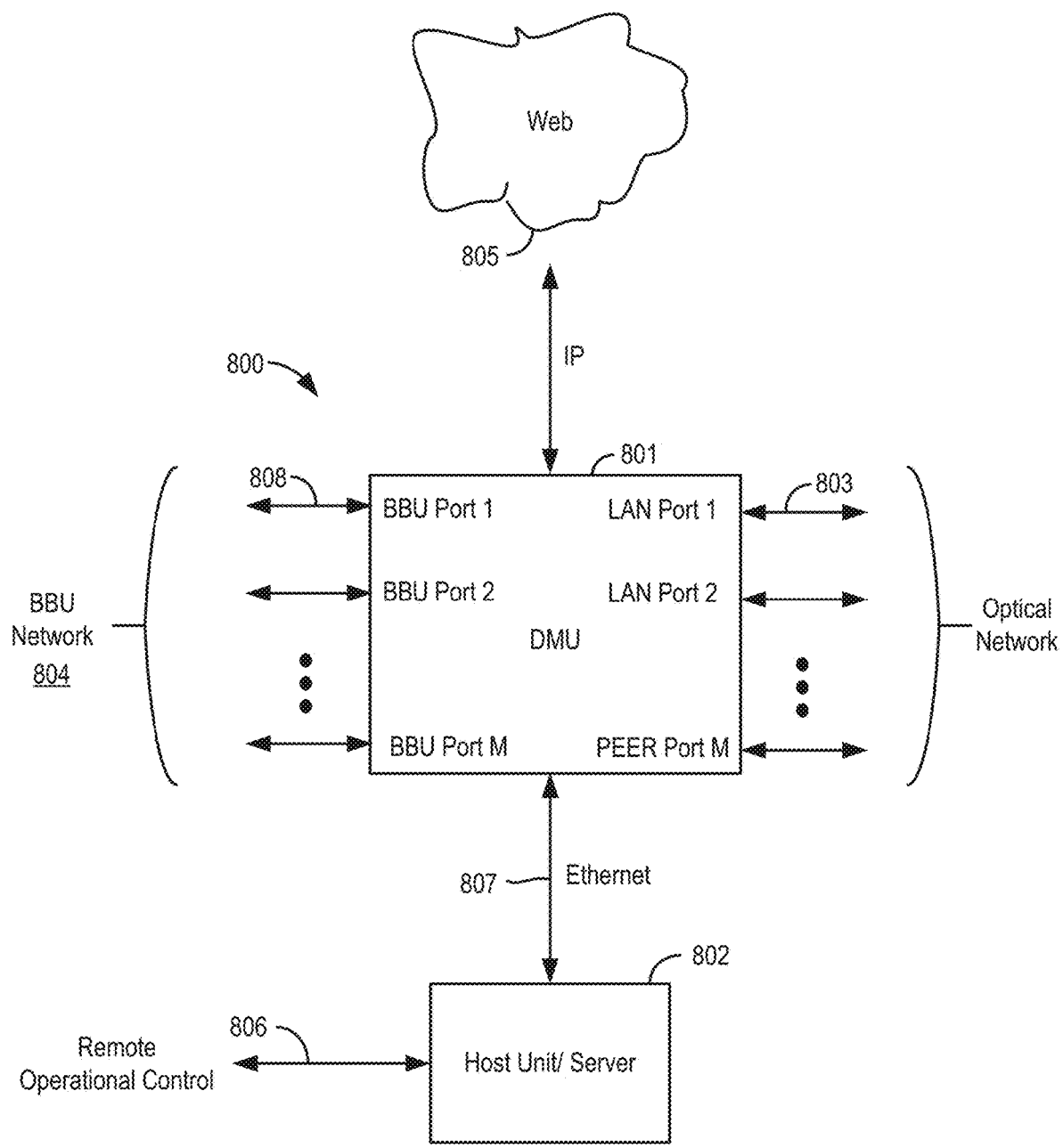
FIG. 8 is a block diagram of a Digital Multiplexer Unit (DMU) according to an embodiment of the present invention.

FIG. 8 shows a block diagram of a Digital Multiplexer Unit (DMU). The DMU 800 includes both a Router and BBU interface nodes. The Router directs the traffic between the LAN ports, BBU Ports and PEER Ports. The BBU nodes can be used for different operator BBU equipment. The router directs the uplink data stream from the LAN and PEER ports to the selected BBU ports. Similarly, the router directs the downlink data stream from the BBU ports to the selected LAN and PEER ports. The BBU port translates the uplink signals destined for its specific port to the interface standard used by the BBU connected to that specific port. Similarly, the downlink signal from a BBU port is translated from the specific BBU protocol standard to a common baseband signal used to collate the various downlink signals. The DMU also contains an Ethernet port (802) so that a remote computer or wireless access points can connect to the internet. The LAN ports of the DMU interface to the various DRUs connected to the DMU. The PEER ports are used to interface to other DMUs or DAUs.

The DMU differs from a DAU in several respects. For a DAU, the interface to the base station is via RF, that is, analog RF signals being received at the DAU. Since the base station includes two entities: a base band unit (BBU), which performs digital baseband signal processing, and an RF unit, which can also be referred to as a radio unit. In systems using a DAU, the BBU passes the digital signal to the RF unit, which upconverts the signal to RF and provides the signal to the DAU, which then converts the RF signal to a digital signal. Embodiments of the present invention, use the DMU to receive the digital signal from the BBU, removing the process of digital to RF conversion followed by RF to digital conversion. Thus, embodiments use the DMU, which provides a digital interface directly to the BBU, thereby bypassing the radio unit in the BTS and bypassing the RF portion present in a DAU.

As discussed in relation to FIG. 1, signal processing may be performed on the digital signals received from the BBU, for example, at BBU port 1, before the digital signals are transmitted to the DRUs through, for example, LAN port 1. Thus, the digital signals received at the BBU ports do not have to be identical to the digital signals transmitted at the LAN ports. Accordingly, the use of the term digital signals herein includes implementations in which digital signals are received, processed by the DMU, and the digital signals are transmitted, not requiring that the received and transmitted digital signals are identical. One of ordinary skill in the art would recognize many variations, modifications, and alternatives.

Referring once again to FIG. 8, inputs 808 are digital inputs from the BBU network and outputs 803 are digital outputs to the DRUs. In addition to signals from the BBU network, the DMU 800 also is able to receive IP traffic from the internet 805 or other source of IP data. Accordingly, both cellular traffic from the BBU network and IP traffic from the internet can move both upstream and downstream through the DMU as illustrated in FIG. 8.

Figure 9:
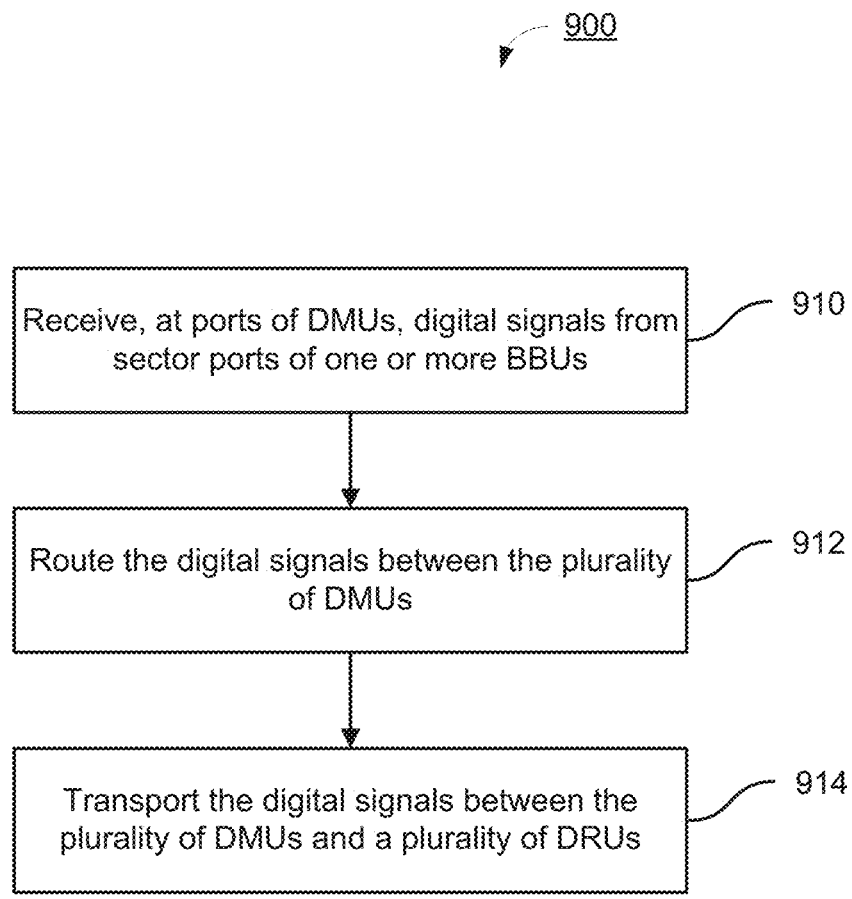
FIG. 9 is a simplified flowchart illustrating a method of routing signals in a DAS according to an embodiment of the present invention.

FIG. 9 is a simplified flowchart illustrating a method of routing signals in a DAS according to an embodiment of the present invention. The DAS includes a plurality of Digital Multiplexer Units (DMUs) and a plurality of Digital Remote Units (DRUs). The method includes receiving, at ports of the plurality of DMUs, digital signals from sector ports of corresponding Base Band Units (BBUs). The ports of the DMU are input/output ports that send and receive digital signals, which may be digital optical signals. The sector ports of the BBUs are associated with sectors of the BBU and are also input/output ports that send and receive digital signals, which may be digital optical signals.

The method also includes routing the digital signals between the plurality of DMUs. As illustrated herein, the DMUs are coupled to each other, for example, at PEER ports, using optical fiber, enabling communication between the DMUs. Routing of the digital signals between the plurality of DMUs can include collating a first digital signal received from a first BBU and a second digital signal received from a second BBU. The digital signals, which can, for example, be associated with Sector 1 of the first BBU and Sector 1 of the second BBU, can then be routed as a combined signal. In this embodiment, the collated digital signal is directed to one of the plurality of DRUs, where the signals can be processed and broadcast using the remote antennas.

The method includes transporting the digital signals between the plurality of DMUs and a plurality of DRUs. The coupling of the DMUs and the DRUs, for example, using optical fiber, enables the digital signals received from the BBUs to be transported to the DRUs and for signals received at the DRUs to be transported to the BBUs.

In some embodiments, routing the digital signals between the DMUs comprises using routing tables. These routing tables can be stored or otherwise provided at a server coupled to the plurality of DMUs. In another implementation, the routing tables are stored or otherwise provided at one or more of the DRUs. In still another implementation, the routing tables, for example, for each DMU and/or each DRU are stored in the cloud. The routing tables can include Merge Blocks that facilitate merging of signals received at multiple DRUs. In an embodiment, a power level of each carrier in each DRU is independently controlled, improving system performance.

It should be appreciated that the specific steps illustrated in FIG. 9 provide a particular method of routing signals in a DAS according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments of the present invention, router tables are used to configure the networked DAUs. The local router tables establish the mapping of the inputs to the various outputs. Internal Merge blocks are utilized for the Downlink Tables when the inputs from an External Port and a PEER Port need to merge into the same data stream. Similarly, Merge blocks are used in the Uplink Tables when the inputs from the LAN Ports and PEER Ports need to merge into the same data stream.

The remote router tables establish the mapping of the inputs to the various outputs. Internal Merge blocks are utilized for the Downlink Tables when the inputs from a LAN Port and a PEER Port need to merge into the same data stream. Similarly, Merge blocks are used in the Uplink Tables when the inputs from the External Ports and PEER Ports need to merge into the same data stream. Additional description related to router tables is provided in U.S. Patent Application Publication No. 2013/0114963, incorporated by reference above.

As an example, the amount of radio resources (such as RF carriers, the power level of each carrier, LTE Resource Blocks, CDMA codes or TDMA time slots) assigned to a particular DMU/DRU or group of DMUs/DRUs can be set via software control to meet desired capacity and throughput objectives or wireless subscriber needs. Applications of the present invention are suitable to be employed with distributed base stations, distributed baseband units, distributed antenna systems, distributed repeaters, mobile equipment and wireless terminals, portable wireless devices, and other wireless communication systems such as microwave and satellite communications.

Figure 10:
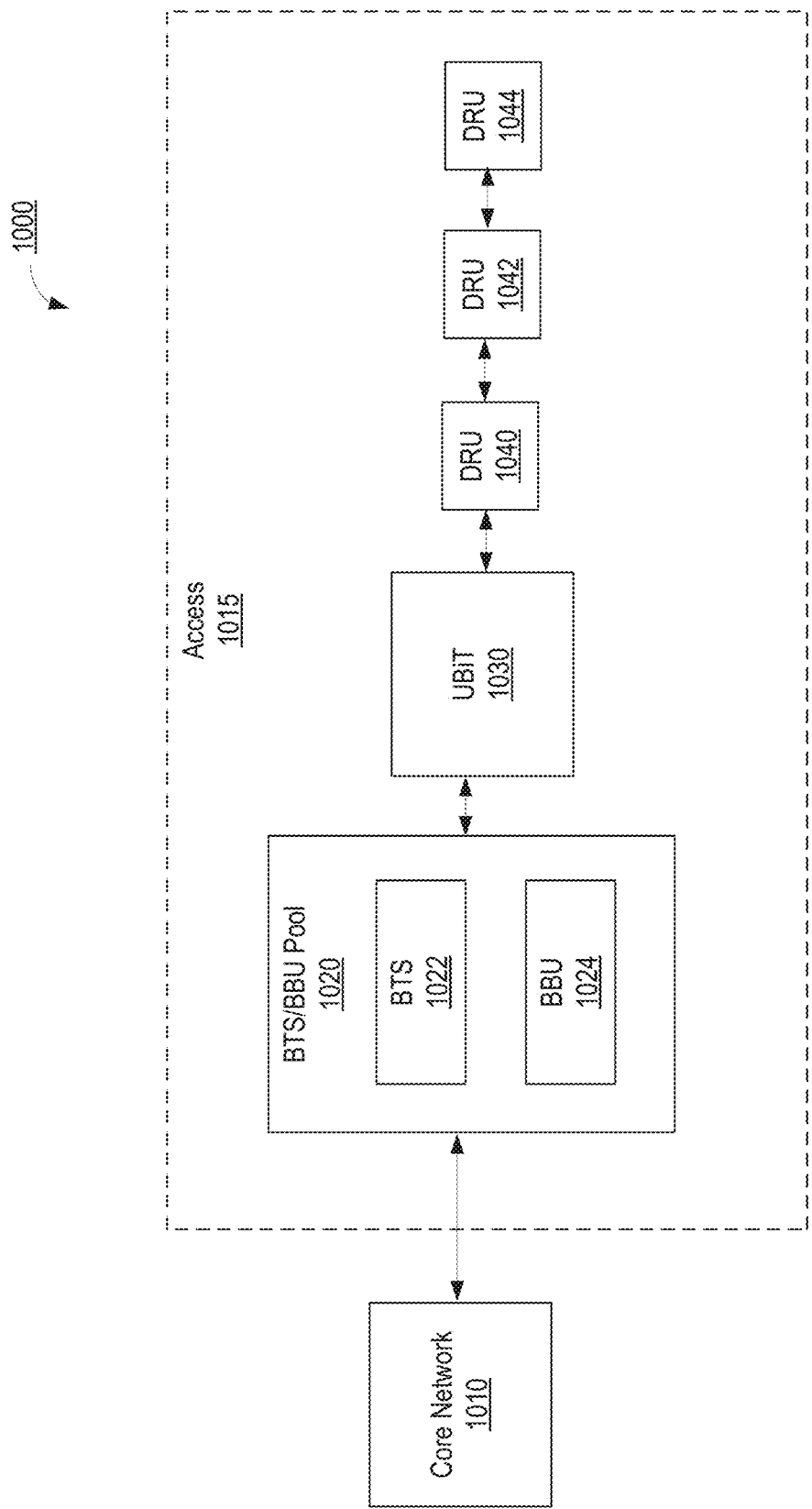
FIG. 10 is a schematic block diagram illustrating a Radio Access Network (RAN) according to an embodiment of the present invention.

FIG. 10 is a schematic block diagram of a Radio Access Network (RAN) 1000 according to an embodiment of the present invention. The RAN 1000 provides connection between the Core Network 1010, in this case, such as an Evolved Packet Core (EPC) network, and user equipment including cellular devices, public safety equipment and Wi-Fi equipment. The Core Network 1010 is connected to a base transceiver station (BTS)/baseband unit (BBU) pool 1020 by Gigabit Ethernet (GbE) backhaul transport, for example, using CAT6/7 cables. The BTS/BBU pool 1020 may include one or more base transceiver stations (BTSs) 1022 and one or more baseband units (BBUs) 1024.

The BTS(s) 1022 and BBU(s) 1024 are in bidirectional communication with one or more universal base station interface trays (UBiTs) 1030, which aggregate and transport base station resources to remote units (e.g., DRUs 1040, 1042, 1044, etc.). The UbiT 1030 is multi-operator, multi-band/channel and multi-standard, and provides an RF and fronthaul interface for packetized data (e.g., CPRI data, ORI data, etc.). In some embodiments, the fronthaul interface of the UbiT 1030 may be included on a single chip. In some embodiments, the fronthaul interface may be included on one board or multiple boards as a rack mounted unit. The UbiT 1030 implements an open application programming interface (API) as its data interface. In one embodiment, the UbiT 1030 provides up to and above 10 Gbps per wavelength digital transport. The UbiT 1030 includes one or more RF conditioners (RFCs), a host unit, and a baseband interface (BBI). The BBI can be a digital multiplexer as described herein.

The digital remote units (DRUs 1040, 1042, 1044) can be in communication with indoor or outdoor antennas, WiFi access points (APs), and/or IP/IoT device(s) or application (s), providing support for cellular service, the public safety band and WiFi. In one embodiment, the WiFi APs and/or IP/IoT device(s) can receive IP traffic from the DRUs. Thus, IP traffic can be routed between the DMUs and the DRUs along with the I/Q data. The DRUs can be software configurable, and be mid power (e.g., +30 dBm/ch, +37 dBm/ch, etc.), or high power (e.g., +43 dBm/ch, +46 dBm/ch, etc.). They can provide channelized processing, capacity routing on demand and IP backhaul (e.g., 1 Gbps, 10 Gbps, etc.). The DRUs can be, for example, any type of remote unit, such as those described herein.

The BTS/BBU pool 1020, the UbiT, and the DRUs 1040, 1042, 1044 may be part of an access network 1015 that may be located at one or more locations remote from core network 1010.

Figure 11:
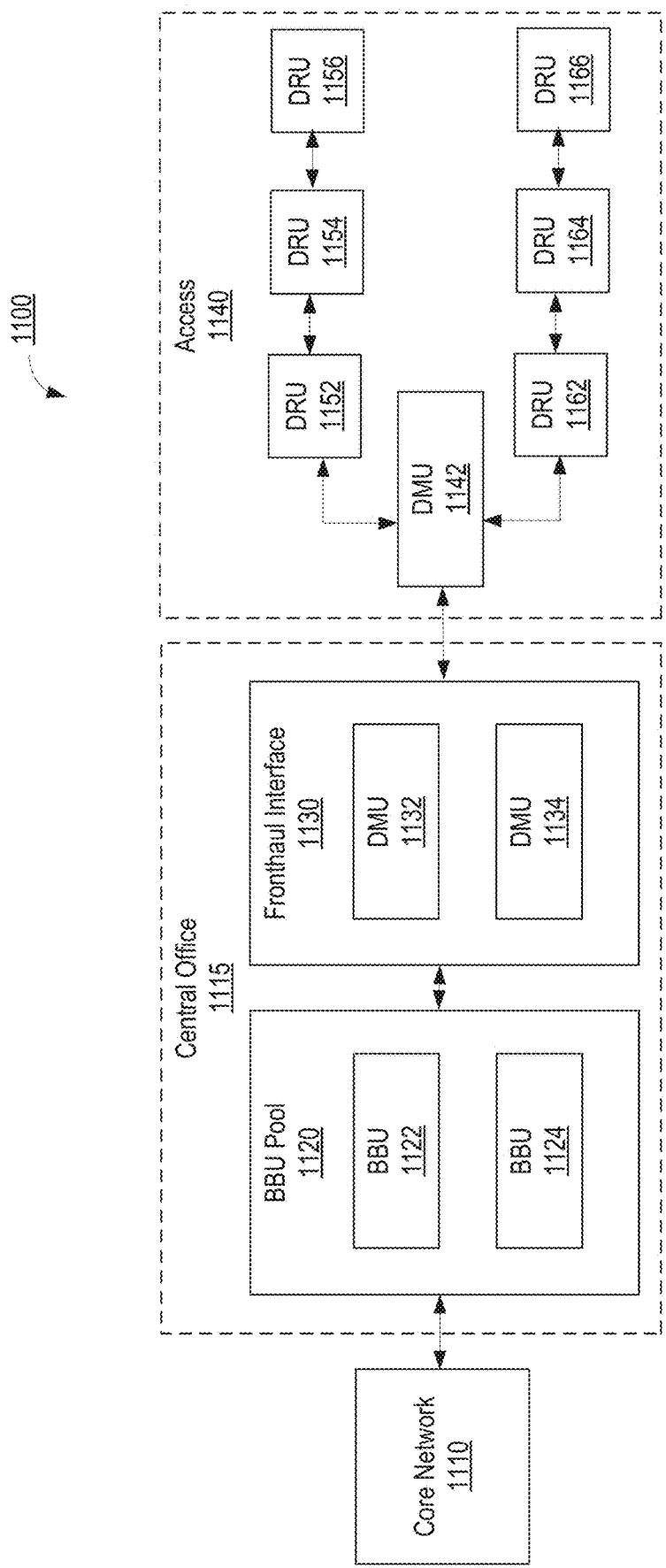
FIG. 11 is a schematic block diagram illustrating a Centralized RAN (C-RAN) according to an embodiment of the present invention.

FIG. 11 is a schematic block diagram of a Centralized Radio Access Network (C-RAN) 1100 according to an embodiment of the present invention. The C-RAN 1100 provides connection between the Core Network 1110, such as an EPC network, and user equipment including cellular devices, public safety equipment and WiFi equipment. The Core Network 1110 is connected to a BBU pool 1120 by GbE backhaul transport, for example, using CAT 6/7 cables. The BBU pool 1120 may include one or more baseband units (BBUs) 1122, 1124.

The BBU pool 1120 is in communication with one or more fronthaul interfaces 1130. The fronthaul interfaces 1130 may include any packetized approaches and/or transport protocols for switching (e.g., routing input ports to output ports) and/or routing (e.g., using a source and destination address scheme). Exemplary fronthaul interfaces 1130 may include switches and/or routers for use with CPRI, ORI, Ethernet, CPRI over Ethernet, and the like. In some embodiments, the fronthaul interfaces 1130 may each be included on a single chip. In some embodiments, the fronthaul interfaces 1130 may be included on one board or multiple boards as a rack mounted unit. The fronthaul interfaces 1130 use DMUs 1132, 1134 to implement packet-based switching and route packets (e.g., payload I/Q data, Control & Management data, header information, IP traffic, etc.). The fronthaul interfaces 1130 communicate directly with various locations, as well as with a further DMU 1142 at another location using the interface standard at 10, 40 or 100 Gbps, for example. The BBU pool 1120 and the fronthaul interface 1130 may together form a central office 1115. The central office 1115 may be located remotely from the core network 1110 in some embodiments.

The DMUs 1132, 1134, 1142 implement open APIs based on a packetized protocol in one embodiment and provide, for example, an up to and above 10 Gbps per wavelength interface. The DMUs 1132, 1134, 1142 provide integrated wavelength division multiplexing (WDM) for, for example, 40 Gbps and 100 Gbps. The DMU 1142 interfaces with one or more DRUs (e.g., DRUs 1152, 1154, 1156, 1162, 1164, 1166). The DMU 1142 and the DRUs 1152, 1154, 1156, 1162, 1164, 1166 may be part of an access network 1140 located at one or more locations remote from the core network 1110 and or the central office 1115.

The fronthaul interfaces 1130 can include any of the DMUs described herein. The DMUs 1132, 1134, 1142 have a forwarding plane and a control plane. The forwarding plane includes the routing paths through the DMU which are configured by the C&M (Control and Management). In some embodiments, the C&M configuration is located in the cloud as described further herein, although these functions can alternatively be configured in a server, as described further herein. The C&M establishes the routing paths between the inputs and outputs of each DMU.

The DMUs 1132, 1134 may be configured to receive a plurality of signals from one or more BBUs 1122, 1124. The DMUs 1132, 1134 may extract a subset of the plurality of signals intended for a particular DRU 1152, 1154, 1156, 1162, 1164, 1166, as specified by C&M information, as described further herein. The DMUs 1132, 1134 may aggregate the subset of the plurality of signals into a stream, and route the stream to one or more DRUs 1152, 1154, 1156, 1162, 1164, 1166. The stream can be routed to the one or more DRUs 1152, 1154, 1156, 1162, 1164, 1166 via the DMU 1142. In some embodiments, the DMU 1142 may decompose the stream, e.g., back into the subset of signals, before routing it to the one or more DRUs 1152, 1154, 1156, 1162, 1164, 1166. As shown in FIG. 11, the DMU 1142 may be collocated with the DRUs 1152, 1154, 1156, 1162, 1164, 1166, for example, at a location remote from the DMUs 1132, 1134.

In one embodiment, the DMU 1142 can be eliminated. In other words, the DMUs 1132, 1134 may route the stream directly to the one or more DRUs 1152, 1154, 1156, 1162, 1164, 1166. In this embodiment, the fronthaul interfaces 1130 can communicate directly with a DRU. This DRU can be daisy chained or deployed in a star configuration with one or more additional DRUs.

The DRUs 1152, 1154, 1156, 1162, 1164, 1166 can be in communication with IP/IoT device(s) or application(s), and can provide support for cellular service, the public safety band and WiFi. In one embodiment, the WiFi APs and/or IP/IoT device(s) can receive IP traffic from the RUs. Accordingly, WiFi APs, in addition to other IoT devices can receive IP traffic. The DRUs 1152, 1154, 1156, 1162, 1164, 1166 can be software configurable, and be low power (e.g., +18 dBm/ch, +23 dBm/ch, etc.), mid power (e.g., +30 dBm/ch, +37 dBm/ch, etc.), or high power (e.g., +43 dBm/ch, +46 dBm/ch, etc.). They can provide channelized processing, capacity routing on demand and IP backhaul (e.g., 1 Gbps, 10 Gbps, higher bandwidths, etc.). The low power DRUs (e.g., hd18-4) are wideband or narrowband (e.g., cover a frequency range from 150 MHz to 70 GHz), have an instantaneous bandwidth, for example, of up to and above 100 MHz, have agile channel positioning, are single, quad- or octo-band/channel, have integrated antennas and WiFi APs and provide IP backhaul. The mid power (e.g., hd30-4) and high power (e.g., hd43-4) DRUs are narrowband, quad band RUs that can be in communication with indoor or outdoor antennas and WiFi APs, and can have an instantaneous bandwidth, for example, up to and above 100 MHz. The DRUs 1152, 1154, 1156, 1162, 1164, 1166 can be, for example, any type of remote unit, such as those described herein.

Figure 12:
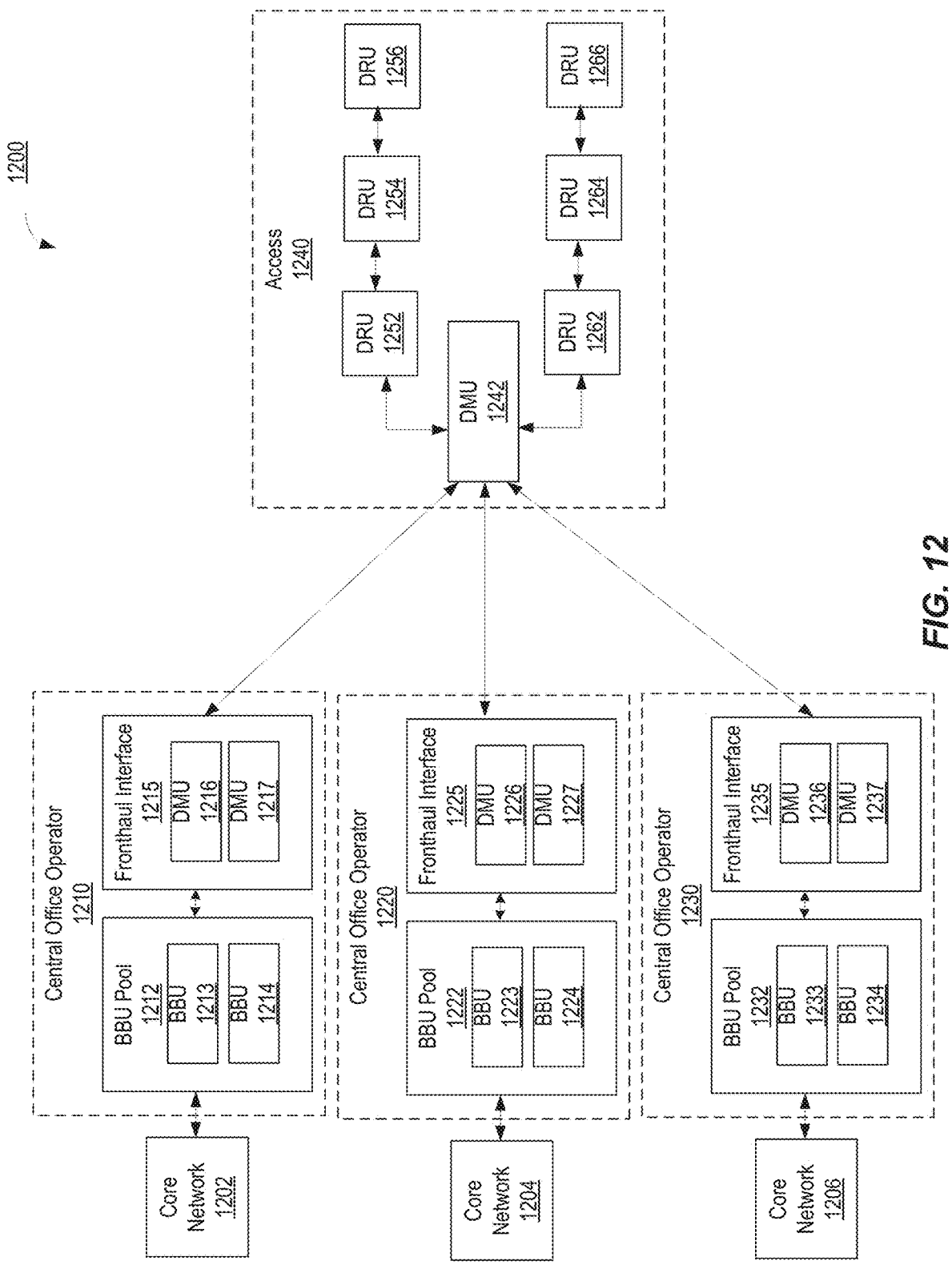
FIG. 12 is a schematic block diagram illustrating a multi-operator C-RAN according to an embodiment of the present invention.

FIG. 12 is a schematic block diagram illustrating a multi-operator C-RAN 1200 according to an embodiment of the present invention. The C-RAN 1200 provides connection between the Core Networks 1202, 1204, 1206, such as EPC networks, and user equipment including cellular devices, public safety equipment and WiFi equipment. The Core Network 1202 is connected to a Central Office Operator 1210 that operates a BBU pool 1212 and a front haul interface 1215. The Core Network 1202 may be connected to the BBU pool 1212 of the Central Office Operator 1210 by GbE backhaul transport, for example, using CAT 6/7 cables. The BBU pool 1212 may include one or more baseband units (BBUs) 1213, 1214.

The Core Network 1204 is connected to another Central Office Operator 1220 that operates a BBU pool 1222 and a fronthaul interface 1225. The Core Network 1202 may be connected to the BBU pool 1222 of the Central Office Operator 1220 by GbE backhaul transport, for example, using CAT 6/7 cables. The BBU pool 1222 may include one or more baseband units (BBUs) 1223, 1224.

The Core Network 1206 is connected to another Central Office Operator 1230 that operates a BBU pool 1232 and a fronthaul interface 1235. The Core Network 1202 may be connected to the BBU pool 1232 of the Central Office Operator 1230 by GbE backhaul transport, for example, using CAT 6/7 cables. The BBU pool 1232 may include one or more baseband units (BBUs) 1233, 1234.

In other words, each Central Office Operator 1210, 1220, 1230 has a respective BBU pool and fronthaul interface, as well as a backhaul to a Core Network 1202, 1204, 1206, respectively. Although shown and described as comprising three Core Networks 1202, 1204, 1206 connected to three Central Office Operators 1210, 1220, 1230, it is contemplated that any number of Core Networks and Central Office Operators may be implemented in accordance with embodiments of the invention. The Central Office Operators 1210, 1220, 1230 may be located remotely from the Core Networks 1202, 1204, 1206, respectively, in some embodiments.

Each of the BBU pools 1212, 1222, 1232 is in communication with one or more fronthaul interfaces 1215, 1225, 1235, respectively. The fronthaul interfaces 1215, 1225, 1235 may include any packetized approaches and/or transport protocols for switching (e.g., routing input ports to output ports) and/or routing (e.g., using a source and destination address scheme). Exemplary fronthaul interfaces 1215, 1225, 1235 may include switches and/or routers for use with CPRI, ORI, Ethernet, CPRI over Ethernet, and the like. In some embodiments, the fronthaul interfaces 1215, 1225, 1235 may each be included on a single chip. In some embodiments, the fronthaul interfaces 1215, 1225, 1235 may be included on one board or multiple boards as a rack mounted unit. The fronthaul interfaces 1215, 1225, 1235 use DMUs (e.g., DMUs 1216, 1217, 1226, 1227, 1236, 1237) to implement packet-based switching and route CPRI packets (payload I/Q data, Control & Management data, header information, IP traffic, etc.). The fronthaul interfaces 1215, 1225, 1235 communicate directly with various locations, as well as with a further DMU 1242 at another location using the interface standard at 10, 40 or 100 Gbps, for example.

The DMUs 1216, 1217, 1226, 1227, 1236, 1237, 1242 implement open APIs based on a packetized protocol in one embodiment and provide, for example, an up to and above 10 Gbps per wavelength interface. The DMUs 1216, 1217, 1226, 1227, 1236, 1237, 1242 provide integrated wavelength division multiplexing (WDM) for, for example, 40 Gbps and 100 Gbps. The DMU 1242 interfaces with one or more DRUs (e.g., DRUs 1252, 1254, 1256, 1262, 1264, 1266). The DMU 1242 and the DRUs 1252, 1254, 1256, 1262, 1264, 1266 may be part of an access network 1240 located at one or more locations remote from the Core Networks 1202, 1204, 1206 and/or the Central Office Operators 1210, 1220, 1230. In this embodiment, the DMU 1242 is capable of aggregating content from multiple different Central Office Operators 1210, 1220, 1230 and sending the aggregated content to one or more DRUs 1252, 1254, 1256, 1262, 1264, 1266, which are operator agnostic. In other words, the embodiment shown and described with respect to FIG. 11 relates to a single operator C-RAN, while the embodiment shown and described with respect to FIG. 12 relates to a multi-operator C-RAN.

The fronthaul interfaces 1215, 1225, 1235 can include any of the DMUs described herein. The DMUs 1216, 1217, 1226, 1227, 1236, 1237, 1242 have a forwarding plane and a control plane. The forwarding plane includes the routing paths through the DMU which are configured by the C&M (Control and Management). In some embodiments, the C&M configuration is located in the cloud as described further herein, although these functions can alternatively be configured in a server, as described further herein. The C&M establishes the routing paths between the inputs and outputs of each DMU.

The DMUs 1216, 1217, 1226, 1227, 1236, 1237 may be configured to receive a plurality of signals from one or more BBUs 1213, 1214, 1223, 1224, 1233, 1234. The DMUs 1216, 1217, 1226, 1227, 1236, 1237 may extract a subset of the plurality of signals intended for a particular DRU 1252, 1254, 1256, 1262, 1264, 1266, as specified by C&M information, as described further herein. The DMUs 1216, 1217, 1226, 1227, 1236, 1237 may aggregate the subset of the plurality of signals into a stream, and route the stream to one or more DRUs 1252, 1254, 1256, 1262, 1264, 1266. The stream can be routed to the one or more DRUs 1252, 1254, 1256, 1262, 1264, 1266 via the DMU 1242. In some embodiments, the DMU 1242 may decompose the stream, e.g., back into the subset of signals, before routing it to the one or more DRUs 1252, 1254, 1256, 1262, 1264, 1266. As shown in FIG. 12, the DMU 1242 may be collocated with the DRUs 1252, 1254, 1256, 1262, 1264, 1266 via the DMU 1242, for example, at a location remote from the DMUs 1216, 1217, 1226, 1227, 1236, 1237.

In one embodiment, the DMU 1242 can be eliminated. In other words, the DMUs 1216, 1217, 1226, 1227, 1236, 1237 may route the stream directly to the one or more DRUs 1252, 1254, 1256, 1262, 1264, 1266. In this embodiment, the fronthaul interfaces 1215, 1225, 1235 can communicate directly with a DRU. This DRU can be daisy chained or deployed in a star configuration with one or more additional DRUs.

The DRUs 1252, 1254, 1256, 1262, 1264, 1266 can be in communication with IP/IoT device(s) or application(s), and can provide support for cellular service, the public safety band and WiFi. In one embodiment, the WiFi APs and/or IP/IoT device(s) can receive IP traffic from the RUs. Accordingly, WiFi APs, in addition to other IoT devices can receive IP traffic. The DRUs 1252, 1254, 1256, 1262, 1264, 1266 can be software configurable, and be low power (e.g., +18 dBm/ch, +23 dBm/ch, etc.), mid power (e.g., +30 dBm/ch, +37 dBm/ch, etc.), or high power (e.g., +43 dBm/ch, +46 dBm/ch, etc.). They can provide channelized processing, capacity routing on demand and IP backhaul (e.g., 1 Gbps, 10 Gbps, higher bandwidths, etc.). The low power DRUs (e.g., hd18-4) are wideband or narrowband (e.g., cover a frequency range of 150 MHz to 70 GHz), have an instantaneous bandwidth, for example, of up to and above 100 MHz, have agile channel positioning, are single, quad- or octo-band/channel, have integrated antennas and WiFi APs and provide IP backhaul. The mid power (e.g., hd30-4) and high power (e.g., hd43-4) DRUs are narrowband, quad band RUs that can be in communication with indoor or outdoor antennas and WiFi APs, and can have an instantaneous bandwidth, for example, up to and above 100 MHz. The DRUs 1252, 1254, 1256, 1262, 1264, 1266 can be, for example, any type of remote unit, such as those described herein.

Figure 13:
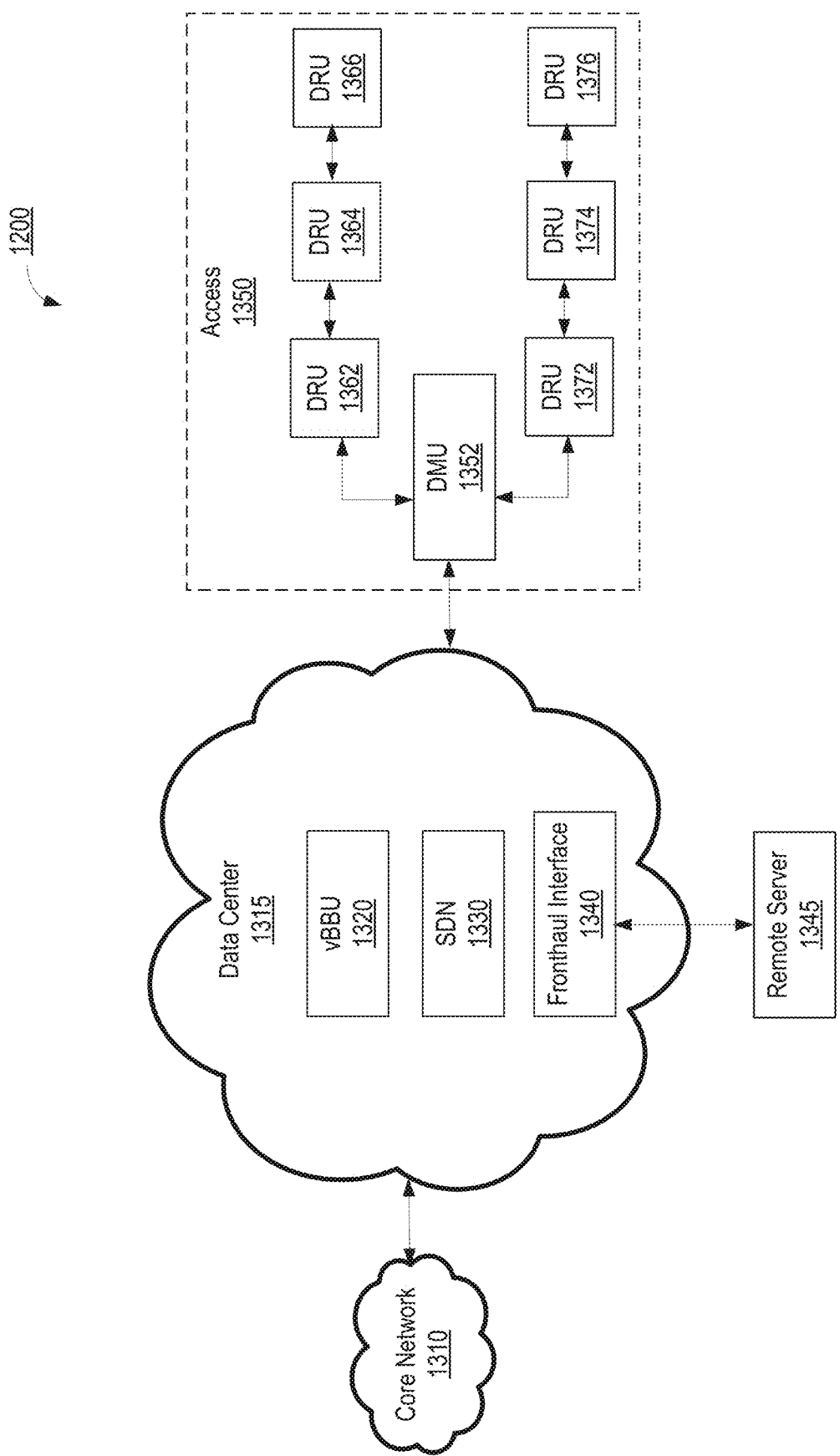
FIG. 13 is a schematic block diagram illustrating a Cloud RAN according to an embodiment of the present invention.

FIG. 13 is a schematic block diagram of a Cloud Radio Access Network 1300 according to an embodiment of the present invention. The Cloud RAN 1300 provides connection between the Core Network 1310, such as an EPC network, and user equipment including cellular devices, public safety equipment and WiFi equipment. The Core Network 1310 is connected to a Data Center 1315 by GbE backhaul transport, for example, using CAT 6/7 cables. The Data Center 1315 may include one or more virtual BBUs (vBBUs) 1320 and one or more fronthaul interfaces 1340. In one embodiment, the virtual BBUs 1320 are implemented using off-the-shelf data servers. The fronthaul interfaces 1340 can include any of the DMUs or DRUs described herein. The DMUs 1352 (and internal to fronthaul interfaces 1340) and DRUs 1362, 1364, 1366, 1372, 1374, 1376 have a forwarding plane and a control plane. The forwarding plane defines the routing paths through the DMUs and DRUs, which are configured by the C&M. The C&M configuration is located in the cloud in one embodiment, although these functions can alternatively be configured in a remote server 1345. The C&M establishes the routing paths between the inputs and outputs of each DMU and DRU.

The Data Center 1315 is implemented via a Software Defined Network (SDN) 1330 and provides remote control and management functionality. In other words, control of the fronthaul interfaces 1340 can be handled in the cloud. The fronthaul interfaces 1340 implement packet-based switching and route (forwarding plane) packets between DMUs and DRUs. In some embodiments, the fronthaul interfaces 1340 may each be included on a single chip. In some embodiments, the fronthaul interfaces 1340 may be included on one board or multiple boards as a rack mounted unit.

The fronthaul interfaces 1340 may include one or more DMUs as described further herein with respect to FIGS. 11 and 12, and may be configured to receive a plurality of signals from one or more virtual BBUs 1320. The DMUs of the fronthaul interfaces 1340 may extract a subset of the plurality of signals intended for a particular DRU 1362, 1364, 1366, 1372, 1374, 1376, as specified by C&M information, as described further herein. The DMUs of the fronthaul interfaces 1340 may aggregate the subset of the plurality of signals into a stream, and route the stream to one or more DRUs 1362, 1364, 1366, 1372, 1374, 1376. The stream can be routed to the one or more DRUs 1362, 1364, 1366, 1372, 1374, 1376 via the DMU 1352. In some embodiments, the DMU 1352 may decompose the stream, e.g., back into the subset of signals, before routing it to the one or more DRUs 1362, 1364, 1366, 1372, 1374, 1376. As shown in FIG. 12, the DMU 1352 may be collocated with the DRUs 1362, 1364, 1366, 1372, 1374, 1376 via the DMU 1352, for example, at a location remote from the fronthaul interfaces 1340.

In one embodiment, the DMU 1352 can be eliminated. In other words, the DMUs of the fronthaul interfaces 1340 may route the stream directly to the one or more DRUs 1362, 1364, 1366, 1372, 1374, 1376. In this embodiment, the fronthaul interfaces 1340 can communicate directly with a DRU. This DRU can be daisy chained or deployed in a star configuration with one or more additional DRUs.

The Data Center 1315 communicates directly with various locations, as well as with a DMU 1352 at one location using the interface standard at 10, 40 or 100 Gbps, for example. The DMU 1352 implements an open API based on a packetized protocol and provides, for example, an up to and above 10 Gbps per wavelength interface. The DMU 1352 provides integrated wavelength division multiplexing (WDM) for, for example, 40 Gbps and 100 Gbps. The DMU 1352 interfaces with one or more DRUs (e.g., DRUs 1362, 1364, 1366, 1372, 1374, 1376). The DMU 1352 and the DRUs 1362, 1364, 1366, 1372, 1374, 1376 may be part of an access network 1350 that may be located remotely at one or more locations.

The DRUs 1362, 1364, 1366, 1372, 1374, 1376 can be in communication with IP/IoT device(s) or application(s), and can provide support for cellular service, the public safety band and WiFi. In one embodiment, the WiFi APs and/or IP/IoT device(s) can receive IP traffic from the RUs. The DRUs 1362, 1364, 1366, 1372, 1374, 137 can be software configurable, and be low power (e.g., +18 dBm/ch, +23 dBm/ch, etc.), mid power (e.g., +30 dBm/ch, +37 dBm/ch, etc.), or high power (e.g., +43 dBm/ch, +46 dBm/ch, etc.). They can provide channelized processing, capacity routing on demand and IP backhaul (e.g., 1 Gbps, 10 Gbps, etc.). The low power DRUs (e.g., hd18-4) are wideband or narrowband (e.g., cover a frequency range from 150 MHz to 70 GHz), have an instantaneous bandwidth, for example, of up to and above 100 MHz, have agile channel positioning, are single or quad band/channel, have integrated antennas and WiFi APs and provide IP backhaul. The mid power (e.g., hd30-4) and high power (e.g., hd43-4) DRUs are narrowband, quad band DRUs that can be in communication with indoor or outdoor antennas and WiFi APs, and can have an instantaneous bandwidth, for example, up to and above 100 MHz. The DRUs 1362, 1364, 1366, 1372, 1374, 1376 can be, for example, any type of remote unit, such as those described herein.

As compared with other embodiments and conventional RANs, the embodiment shown in FIG. 13 has a substantially reduced amount of equipment utilized for deployment. For example, the implementation shown in FIG. 13 does not necessarily require UBiTs and RFCs.

Figure 14:
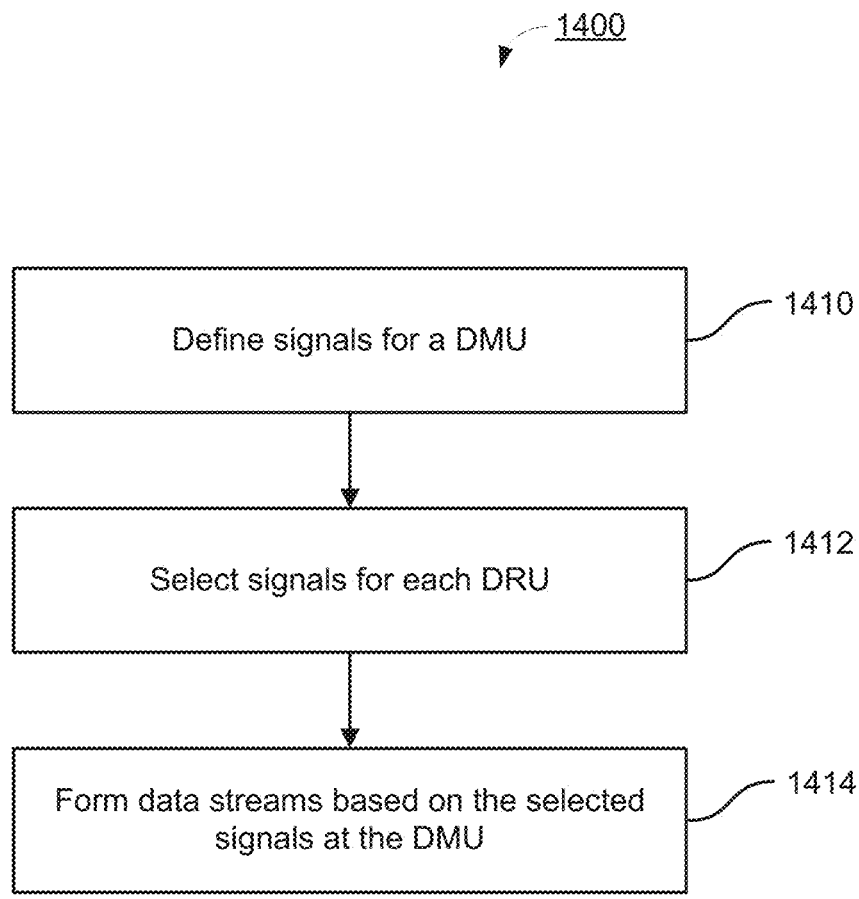
FIG. 14 is a simplified flowchart illustrating a method of control and management (C&M) of the RAN according to an embodiment of the present invention.

FIG. 14 is a simplified flowchart 1400 illustrating a method of control and management (C&M) of the RAN according to an embodiment of the present invention. In some embodiments, some or all of the C&M functionality illustrated by flowchart 1400 may be implemented in a cloud network, as described further herein. At step 1410, signals are defined at a DMU. Although described as occurring "at a DMU", it is contemplated that the signals can be defined on a cloud (e.g., by an application over the Internet), by a remote server, and/or by plugging directly into the DMU.

Figure 15:
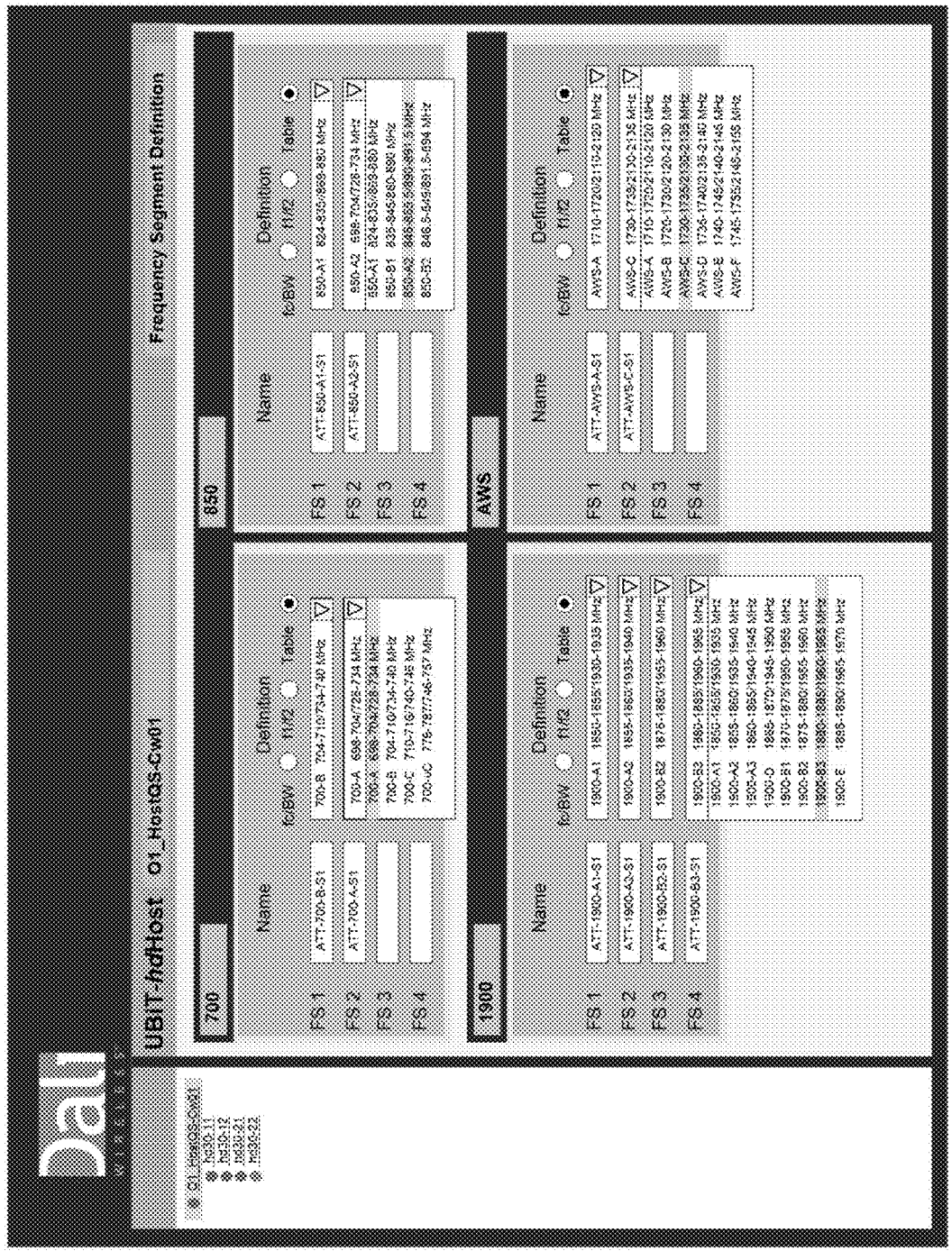
FIG. 15 is a screen shot illustrating a user interface for control and management of a DMU according to an embodiment of the present invention.

FIG. 15 is a screen shot of an exemplary user interface 1500 for defining signals in one implementation of step 1410 of FIG. 14. As shown in FIG. 15, a DMU is selected ("O1_HostQS-Cw01"). The DMU selected in FIG. 15 is a quad-band unit defined by bands of 700 MHz, 850 MHz, 1900 MHz and AWS. Signals may be defined by their center frequency, bandwidth, start frequency-stop frequency, a table, a graphic, and/or the like. In FIG. 15, a table is selected that is pre-populated with bands defined by regulatory bodies (e.g., "700-A 698-704/728-734 MHz"). The signals may also be defined by assigning names (e.g., "ATT-700-B-S1").

In some embodiments, at step 1410 of FIG. 14, a check is made to ensure that the number of defined signals is less than or equal to a maximum number of signals that that DMU can process. If the number of defined signals exceeds the maximum number of signals, the user requesting definition of the signals may be informed.

Once the signals are defined, the signals can be allocated to specific DRUs. At step 1412 of FIG. 14, signals are selected for each DRU. It is contemplated that the signals can be allocated on a cloud (e.g., by an application over the Internet), by a remote server, and/or by plugging directly into one or more DRUs.

Figure 16:
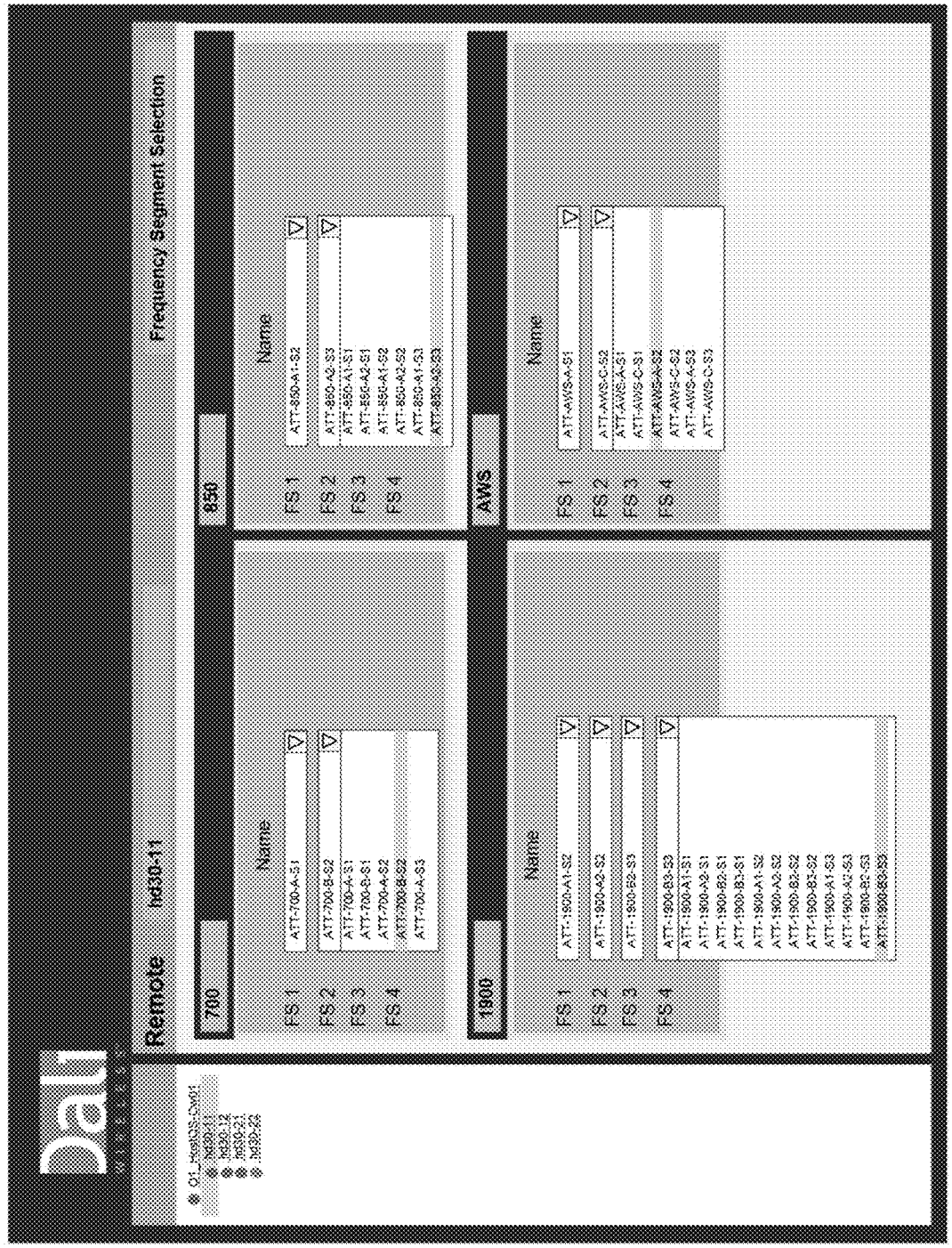
FIG. 16 is a screen shot illustrating a user interface for control and management of a DRU according to an embodiment of the present invention.

FIG. 16 is a screen shot of an exemplary user interface 1600 for selecting signals in one implementation of step 1412 of FIG. 14. As shown in FIG. 16, a DRU is selected ("hd30-11"). The DRU selected in FIG. 16 is a quad-band unit defined by bands of 700 MHz, 850 MHz, 1900 MHz and AWS. Drop-down boxes allow a user to select signals according to their name assigned in step 1410 (e.g., "ATT-700-A-S1"), from the pool of all signals defined in step 1410. By selecting a particular signal name, the signal corresponding to that signal name will be processed on that particular DRU.

In some embodiments, at step 1412 of FIG. 14, a check may be made to ensure that the number of selected signals is less than or equal to a maximum number of signals that that DRU can process. If the number of selected signals exceeds the maximum number of signals, the user requesting selection of the signals may be informed. In some embodiments, at step 1412 of FIG. 14, a check may be made to ensure that the total bandwidth of the selected signals for the cluster of DRUs fed from the DMU of step 1410 is less than or equal to the maximum bandwidth of signals that can be transported over the optical link between the DMU and the DRUs. If the total bandwidth exceeds the maximum bandwidth, the user requesting selection of the signals may be informed.

Once the signals are selected for one or more DRUs, serial data streams can be created. At step 1414 of FIG. 14, data streams are formed for each DRU or cluster of DRUs based on the selected signals at the DMU. Although described as occurring "at a DMU", it is contemplated that the signals can be defined on a cloud (e.g., by an application over the Internet), by a remote server, and/or by plugging directly into the DMU. Thus, the selected signals may be routed from the DMU to the one or more DRUs specified at step 1412.

Figure 17:
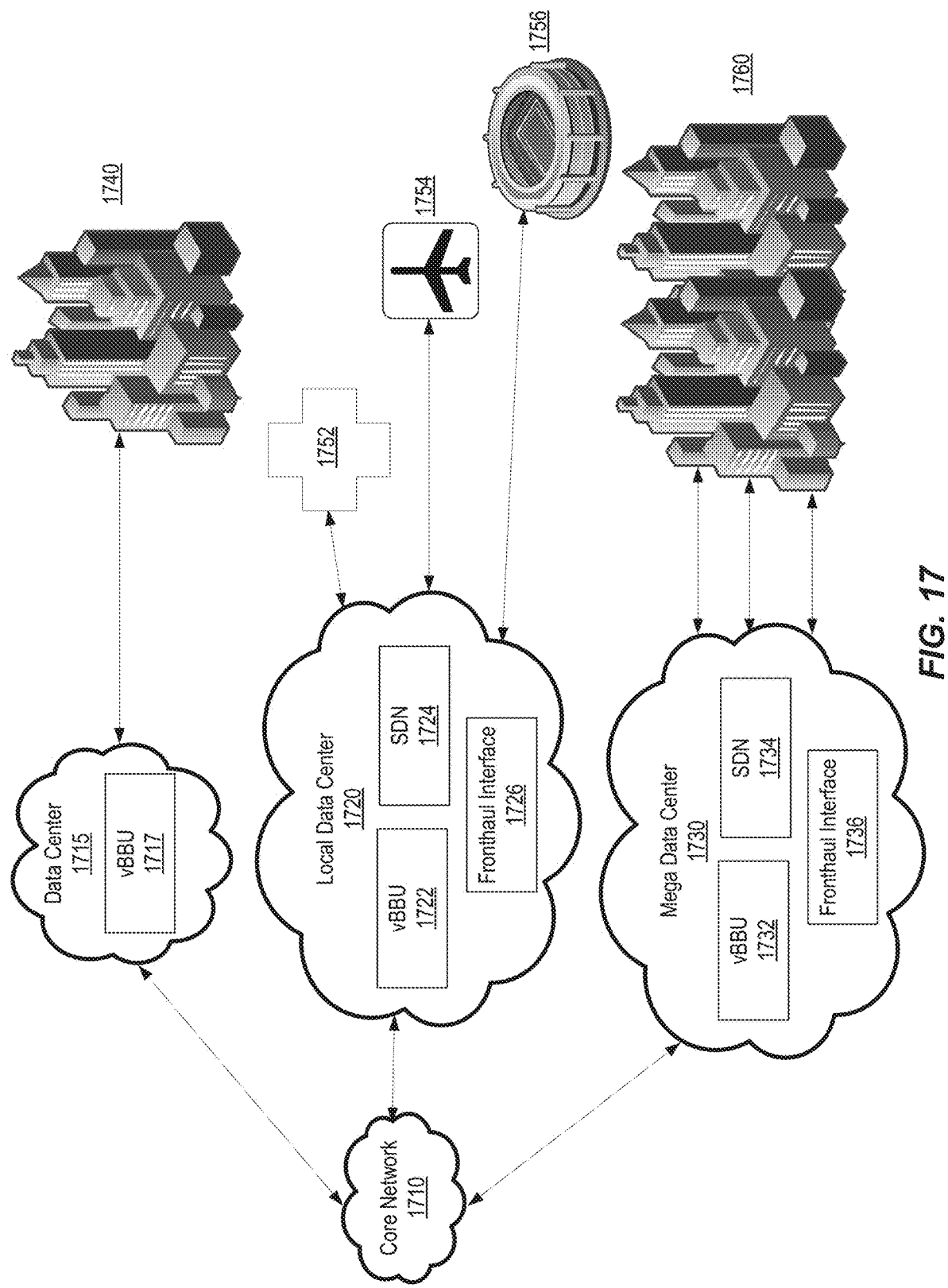
FIG. 17 is a schematic block diagram illustrating a Cloud RAN in a metro network according to an embodiment of the present invention.

FIG. 17 is an overall schematic block diagram of a Cloud RAN according to an embodiment of the invention. A Core Network 1710 communicates via GbE backhaul transport with a Data Center 1715 (comprising virtual BBUs 1717), a Local Data Center 1720 (comprising virtual BBUs 1722, fronthaul interfaces 1726, and an SDN 1724), and a Mega Data Center 1730 (comprising virtual BBUs 1732, fronthaul interfaces 1736, and an SDN 1734). The Data Center 1715, Local Data Center 1720 and Mega Data Center 1730 use packetized fronthaul transport to provide outdoor and indoor DAS coverage at a variety of locations 1740, 1752, 1754, 1756, 1760. The Cloud RAN shown in FIG. 17 can be implemented using the components illustrated with respect to FIG. 13, for example.

It is understood that the examples and embodiments described herein are for illustrative purposes only and that various modifications or changes in light thereof will be suggested to persons skilled in the art and are to be included within the spirit and purview of this application and scope of the appended claims.

APPENDIX I IS A GLOSSARY OF TERMS USED HEREIN, INCLUDING ACRONYMS

APPENDIX I

Glossary of Terms

| | |
|---|---|
| ACLR | Adjacent Channel Leakage Ratio |
| ACPR | Adjacent Channel Power Ratio |
| ADC | Analog to Digital Converter |
| AQDM | Analog Quadrature Demodulator |
| AQM | Analog Quadrature Modulator |
| AQDMC | Analog Quadrature Demodulator Corrector |
| AQMC | Analog Quadrature Modulator Corrector |
| BPF | Bandpass Filter |
| CDMA | Code Division Multiple Access |
| CFR | Crest Factor Reduction |
| DAC | Digital to Analog Converter |
| DET | Detector |
| DHMPA | Digital Hybrid Mode Power Amplifier |
| DDC | Digital Down Converter |
| DNC | Down Converter |
| DPA | Doherty Power Amplifier |
| DQDM | Digital Quadrature Demodulator |
| DQM | Digital Quadrature Modulator |
| DSP | Digital Signal Processing |
| DUC | Digital Up Converter |
| EER | Envelope Elimination and Restoration |
| EF | Envelope Following |
| ET | Envelope Tracking |
| EVM | Error Vector Magnitude |
| FFLPA | Feedforward Linear Power Amplifier |
| FIR | Finite Impulse Response |
| FPGA | Field-Programmable Gate Array |
| GSM | Global System for Mobile communications |
| I-Q | In-phase/Quadrature |
| IF | Intermediate Frequency |
| LINC | Linear Amplification using Nonlinear Components |
| LO | Local Oscillator |
| LPF | Low Pass Filter |
| MCPA | Multi-Carrier Power Amplifier |
| MDS | Multi-Directional Search |
| OFDM | Orthogonal Frequency Division Multiplexing |
| PA | Power Amplifier |
| PAPR | Peak-to-Average Power Ratio |
| PD | Digital Baseband Predistortion |
| PLL | Phase Locked Loop |
| QAM | Quadrature Amplitude Modulation |
| QPSK | Quadrature Phase Shift Keying |
| RF | Radio Frequency |
| RRH | Remote Radio Head |
| RRU | Remote Radio Head Unit |
| SAW | Surface Acoustic Wave Filter |
| UMTS | Universal Mobile Telecommunications System |
| UPC | Up Converter |
| WCDMA | Wideband Code Division Multiple Access |
| WLAN | Wireless Local Area Network |

What is claimed is:

1. A system comprising:
    a first fronthaul interface including a plurality of first digital multiplexing units (DMUs), wherein each first DMU of the plurality of first DMUs is in communication with a plurality of digital remote units (DRUs) that provide radio coverage in a given geographic location associated with the first DMU that is different from one or more geographic locations associated with other first DMUs of the plurality of first DMUs, is in communication with at least one other first DMU of the plurality of first DMUs, and is configured to:
    receive a plurality of first signals from a first baseband unit (BBU) and from one or more other first DMUs of the plurality of first DMUs;
    extract a first subset of the plurality of first signals associated with the plurality of DRUs associated with the first DMU;

aggregate the first subset of the plurality of first signals into a first stream; and
route the first stream to one or more DRUs of the plurality of DRUs.

2. A system comprising:
a first fronthaul interface including a plurality of first digital multiplexing units (DMUs), wherein each first DMU of the plurality of first DMUs is in communication with a plurality of digital remote units (DRUs) that provide radio coverage in a given geographic location associated with the first DMU that is different from one or more geographic locations associated with other first DMUs of the plurality of first DMUs and is in communication with at least one other first DMU of the plurality of first DMUs, and a first DMU of the plurality of first DMU is configured to:
receive a plurality of first signals from a first baseband unit (BBU) and from one or more other first DMUs of the plurality of first DMUs;
extract a first subset of the plurality of first signals associated with a plurality of DRUs;
aggregate the first subset of the plurality of first signals into a first stream; and
route the first stream to one or more second DMUs.

3. The system of claim 2, further comprising at least a second BBU.

4. The system of claim 3, wherein the first and the second BBUs are in a BBU pool.

5. The system of claim 2, wherein the first BBU is connectable to a core network.

6. The system of claim 2, wherein the one or more second DMUs are connected to the plurality of DRUs.

7. The system of claim 6, wherein each of the plurality of DRUs includes at least one LAN port and at least one physical node.

8. The system of claim 6, wherein each of the plurality of DRUs includes a PEER port.

9. The system of claim 6, wherein each of the plurality of DRUs includes an ethernet port.

10. The system of claim 6, wherein each of the plurality of DRUs includes at least one LAN port coupled to an optical network.

11. The system of claim 6, wherein the plurality of DRUs are collocated with the one or more second DMUs.

12. The system of claim 6, wherein the plurality of DRUs provide support for one or more of cellular service, public safety and WiFi.

13. The system of claim 6, wherein the plurality of first DMUs implement packet based switching and route packets.

14. The system of claim 13, wherein the packets include one or more of payload I/Q data, control and management data, header information, and IP traffic.

15. The system of claim 2, further comprising:
a second fronthaul interface including a second plurality of first digital multiplexing units (DMUs), wherein each first DMU of the second plurality of first DMUs is configured to:
receive a plurality of second signals from a second baseband unit (BBU);
extract a second subset of the plurality of second signals;
aggregate the second subset of the plurality of second signals into a second stream; and
route the second stream to the one or more second DMUs.

16. The system of claim 15, wherein each of the first fronthaul interface and the second fronthaul interface is associated with a different central office operator.

17. The system of claim 2, wherein each first DMU includes at least one LAN port and at least one BBU port.

18. The system of claim 2, wherein each first DMU includes a peer port.

19. The system of claim 2, wherein the plurality of first DMUs and the one or more second DMUs are connected via one or more optical cables.

20. The system of claim 2, wherein the first BBU is included in a BBU pool of a plurality of BBU pools, wherein each BBU pool of the plurality of BBU pools is associated with a different central office operator and a different core network.

21. A system comprising:
a fronthaul interface including a plurality of first digital multiplexing units (DMUs), wherein each first DMU of the plurality of first DMUs is in communication with a plurality of digital remote units (DRUs) that provide radio coverage in a given geographic location associated with the first DMU that is different from one or more geographic locations associated with other first DMUs of the plurality of first DMUs and is in communication with at least one other first DMU of the plurality of first DMUs, and a first DMU of the plurality of first DMU is configured to:
receive a plurality of signals from a baseband unit (BBU) and from one or more other first DMUs of the plurality of first DMUs;
extract a first subset of the plurality of signals associated with a plurality of DRUs;
aggregate the first subset of the plurality of signals into a stream; and
route the stream to one or more DRUs of the plurality of DRUs via a second DMU.

* * * * *